United States Patent [19]

Anderson et al.

[11] Patent Number: 4,720,640

[45] Date of Patent: Jan. 19, 1988

[54] FLUID POWERED ELECTRICAL GENERATOR

[75] Inventors: Bjorn M. S. Anderson, Woodside; Reinhold H. Ziegler, Berkeley, both of Calif.

[73] Assignee: TurboStar, Inc., Menlo Park, Calif.

[21] Appl. No.: 779,227

[22] Filed: Sep. 23, 1985

[51] Int. Cl.[4] ............................................. F03B 13/10
[52] U.S. Cl. ........................................ 290/43; 290/54; 415/2 R; 415/4; 416/9; 416/93 R; 416/179
[58] Field of Search ..................... 290/42–44, 290/53–55; 415/2–4, 146, 147, DIG. 1; 416/9, 93 R, 179–184; 310/68 R, 68 B, 68 D, 87, 154, 156, 254, 179–181, 185, 268

[56] References Cited

U.S. PATENT DOCUMENTS

| | | | |
|---|---|---|---|
| 984,599 | 2/1911 | Pichault | 415/2 A |
| 1,783,669 | 12/1930 | Oliver | 415/2 A |
| 1,944,239 | 1/1934 | Honnef | 290/55 |
| 2,517,135 | 8/1950 | Rudisill | 416/9 X |
| 2,563,279 | 8/1951 | Rushing | 290/55 X |
| 2,970,238 | 1/1961 | Swiggett | 310/268 |
| 3,624,439 | 11/1971 | Tokutomi | 310/154 |
| 4,021,135 | 5/1977 | Pederson et al. | 415/2 A |
| 4,075,500 | 2/1978 | Oman et al. | 290/55 |
| 4,078,388 | 3/1978 | Atencio | 290/53 X |
| 4,118,636 | 10/1978 | Christian | 290/54 X |
| 4,132,499 | 1/1979 | Iogra | 415/3 A X |
| 4,204,799 | 5/1980 | de Geus | 415/3 A X |
| 4,261,171 | 4/1981 | Atencio | 290/53 X |
| 4,275,989 | 6/1981 | Atencio | 415/129 |
| 4,276,482 | 6/1981 | Crockett | 290/52 |
| 4,279,539 | 7/1981 | Atencio | 290/53 X |
| 4,309,621 | 1/1982 | Litz | 290/52 |
| 4,324,985 | 4/1982 | Oman | 415/2 A X |
| 4,326,819 | 4/1982 | Atencio | 290/53 X |
| 4,352,989 | 10/1982 | Atencio | 290/53 |
| 4,367,413 | 1/1983 | Nair | 290/52 |

*Primary Examiner*—Patrick R. Salce
*Assistant Examiner*—Emanuel Todd Voeltz
*Attorney, Agent, or Firm*—Limbach, Limbach & Sutton

[57] ABSTRACT

A fluid powered electrical generator having an impellor-rotor rotatively mounted on a central support structure. A toroidal outer support structure surrounds the impellor-rotor, with the impellor-rotor including a plurality of circumferentially spaced-apart fluid dynamic blades. The outward ends of the blades are connected together by a rotor rings which is coaxial with respect to the outer support structure. The central support structure is supported within the outer support structure by stanchions or the like so as to permit a fluid stream to flow therebetween past the fluid dynamic blades. A peripheral electrical generator having a rotor element secured to the rotor ring and a stator element secured to the outer support structure produces electrical energy as the impellor-rotor is driven by the fluid stream.

63 Claims, 35 Drawing Figures

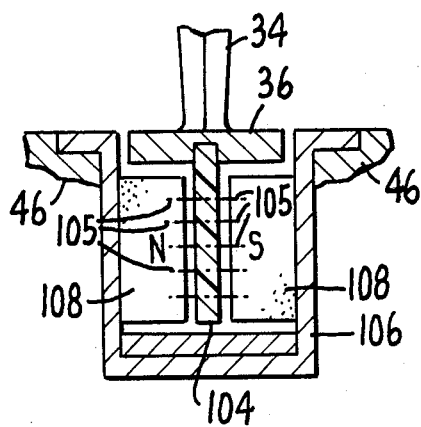
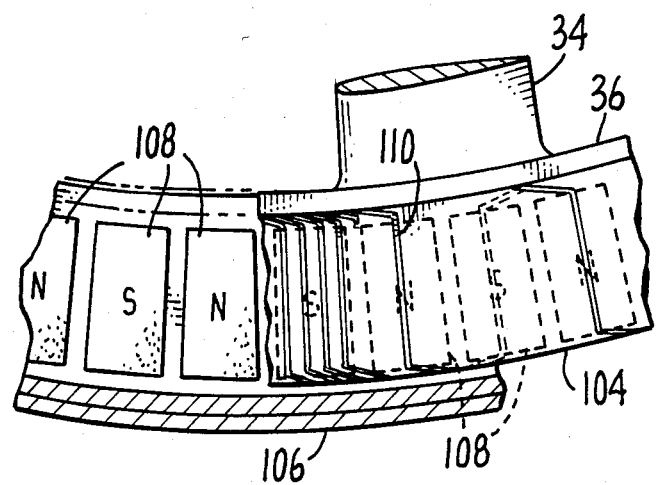
FIG.3A.
FIG.3B.
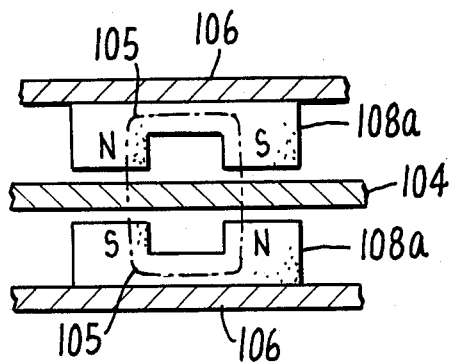
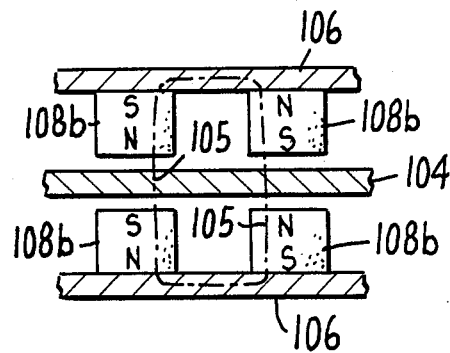
FIG.3C.
FIG.3D.
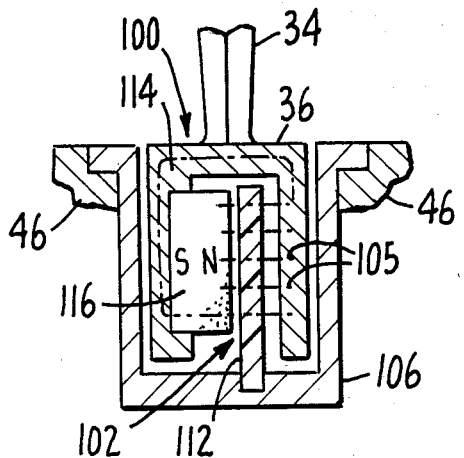
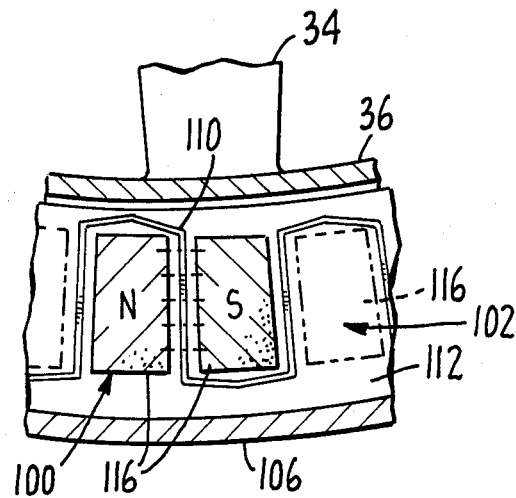
FIG.3E.
FIG.3F.

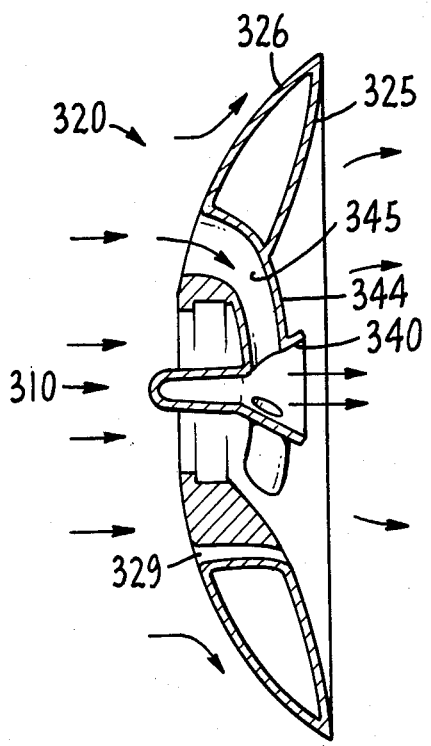
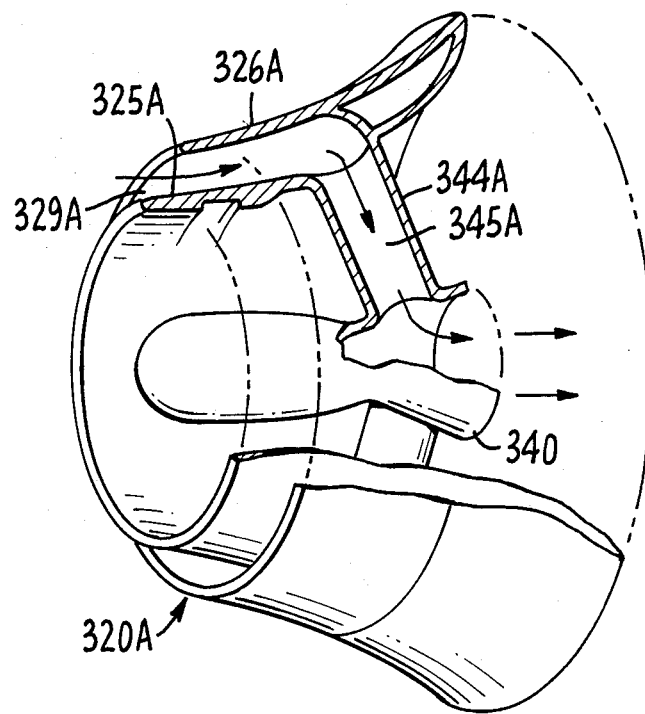
FIG. 11.          FIG. 12.
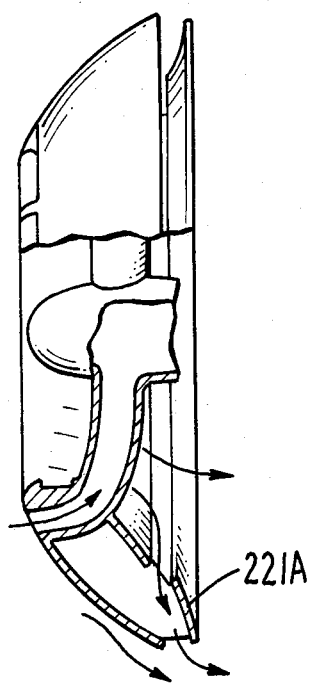
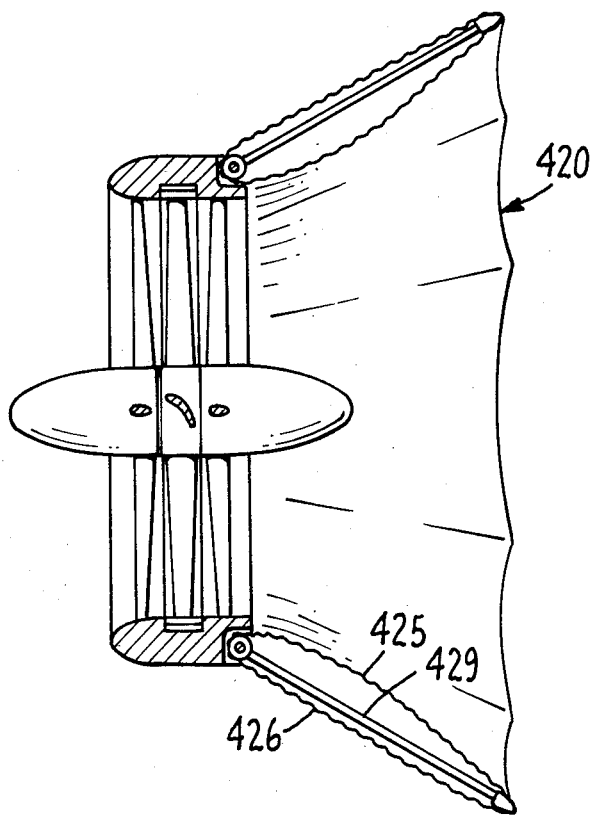
FIG. 13.          FIG. 14.

FLUID POWERED ELECTRICAL GENERATOR

DESCRIPTION

The present invention relates in general to an axial flow fluid energy conversion method and apparatus and more particularly to an axial flow fluid turbine generator method and apparatus.

BACKGROUND TO THE INVENTION

One of the oldest methods of extracting energy from fluids in motion is by means of bladed rotating machines such as, for example, windmills exposed to the wind and hydro impellors powered by the fluid reaction of moving water. While these devices have been successfully employed for many hundreds of years, there still remain major unresolved technical problems in the design of conventional wind turbines which make them problematic for small and large scale energy production.

These technical problems fall into basically three categories: fluid dynamics, dynamic stress, and electrical conversion.

The fluid dynamic difficulties can best be appreciated by the Betz theory which expresses limitation on potential energy conversion and which is described in Technical Note #75 "Meteorological Aspects of Utilization of Wind as an Energy Source," World Meteorological Organization 1981. The column of air (wind) impelling upon the windmills blades is slowed and its boundary is an expanding envelope where streamlines meet turbulence behind the rotor. Attempts to shroud the envelope to utilize the lower pressure behind the blades as a fluid dynamic advantage have been suggested in U.S. Pat. No. 4,075,500 as well as others. To date no practical cost effective method exists for fabricating ducted shrouds, much less balance them on support structures.

Mechanical stresses induced on the blading and support structure present further limitations especially for large windmills. On the supporting structure the axial stress representing the force which tends to overturn the windmill, or the thrust on the bearing, must be kept within limits at all wind speeds. To accomplish these results and to generate sufficient and efficient power, large diameter blades with built-in governors for adjusting the pitch angles of the blades have been utilized. These mechanisms proposed to date make the blades fragile and costly.

Furthermore, large diameter blades, such as over 100 feet in length, present significant dynamic stress problems. The increased blade length of larger rotors requires greatly increased blade stiffness and reduced weight in order to insure that critical vibrational frequencies of the blade remain sufficiently outside the excitation frequencies associated with routine operation so that the blades do not become unstable. A combination of gravitational force and torque force on each blade element functions to cyclically stress the blade element as it rotates in a rising direction and then a falling direction. Long blades supported at their roots and under the influence of the aforementioned oscillating forces are subjected to an increasingly severe and complex system of dynamic instabilities. It is difficult and expensive to safeguard against such instabilities. Blade stiffness to weight ratio improvements and advanced design methods can help but there is always a practical maximum to the size of blades being employed by wind turbines.

Finally, conventional wind turbines generate power through a gearbox and conventional generator. Although these generators are commonly available, they represent a one hundred year old technology that has not incorporated recent technological breakthroughs in material science, power control and aerodynamics. These generators, while compact, are heavy because of the massive laminated iron core and copper windings.

PRIOR ART

It has long been thought that substantial performance advantages could be realized by the use of a shroud and diffuser on a fluid turbine (see "A Preliminary Report on Design and Performance of Ducted Windmills" G. N. M. Lilley and W. J. Rainbird, The British Electrical and Allied Industries Research Association, Great Britain Technical Report C/T119,1957). Prior work by Grumman Aerospace Corporation as described in U.S. Pat. No. 4,075,500 indicated that diffuser augmented turbines could produce at least twice the power output of conventional turbines.

Other prior art patents showing shrouded wind turbines are U.S. Pat. Nos. 1,783,669; 2,017,961; 2,339,078; 2,517,135; and 2,563,279. U.S. Pat. No. 1,944,239 discloses an electric wind dynamo consisting of two counter-rotating blade wheels which can include a single armature wheel connected to the partial span of the blades to cooperate with field magnets carried by a rigid bracket.

Ducted turbines have been shown to be the most effective way to augment the power output from conventional turbines but also the most expensive way. To date no practical, economical wind turbine has been produced.

Various coil and magnet structures are disclosed in U.S. Pat. Nos. 1,944,239, 4,088,352, 4,276,482, 4,309,621 and 4,367,413.

OBJECTS OF THE PRESENT INVENTION

An object of the present invention is to provide an energy conversion method and apparatus to avoid the fluid dynamics, structural dynamics and electrical problems of conventional fluid turbines.

A particular object of the present invention is to provide a shrouded fluid turbine structure with improved efficiency and mechanical stability.

A further object of the present invention is to provide a monolithic rotor that functions simultaneously as a fluid impellor and electromagnetic rotor thereby saving on construction, safety and maintenance, while eliminating a transmission gearbox.

It is a further object of the present invention to provide economical methods for constructing aero and hydrodynamic shrouds and thereby produce a machine that can take advantage of low speed fluid flows.

It is still a further object of the present invention to provide a modular constructed ducted shroud with boundary layer control that is simultaneously flexible and adapted to a variety of flow streams (wind or water).

It is still another object of the present invention to provide unique methods and apparatus for venting fluid from the fluid stream in and through the shroud and turbocage of the turbine in accordance with the present invention.

It is still a further additional object of the present invention to provide a mounting mechanism that treats the rotor as a gyroscope and to utilize the precession which occurs when external torques are exerted on a rotating gyroscope to position the rotor.

It is still a further object of this invention to incorporate airfoils as stabilizing elevators which can tilt the axis of the unit out of the fluid flow stream when overspeed occurs.

It is still yet a further object of the present invention to produce electrical power over a wide range of drive fluid velocities.

It is an additional object of the present invention to provide a rotor armature having a low moment of inertia which is responsive to rapid changes in drive fluid velocity.

It is still an additional object of the present invention to provide a fluid driven electrical generator which does not require the use of friction producing and necessary to replace brushes and slip rings.

It is yet still an additional object of the present invention to alternatively provide a fluid driven generator armature which acts as a flywheel for temporarily storing energy.

Broadly stated the present invention to be described in greater detail below is directed to an axial flow fluid turbine generator apparatus incorporating a central support structure, a hollow outer support structure surrounding and connected to the central support structure and adapted to pass a stream of fluid between such support structures and an impellor-rotor rotatively mounted on the central support structure and including a plurality of circumferentially spaced fluid dynamic blades for transferring energy from a stream of fluid and a ring connecting the radial outward ends of the blades.

A feature and advantage of the present invention is that electrical generating structures can be provided on the ring on the impellor-rotor and a surrounding stator portion of the outer support structure.

In accordance with another aspect of the present invention an armature comprised of a number of different coil configurations can be provided on the peripheral ring of the impellor-rotor for interaction with magnetic circuits located on a surrounding, closely spaced stator portion of the outer support structure.

In accordance with another aspect of the present invention different magnetic circuit configurations can be provided on the ring periphery of the impellor-rotor for cooperation with coil circuits mounted on the closely spaced stator portion of the outer support structure.

In accordance with another aspect of the present invention, a monolithic armature can be provided having an insulating substrate and individual coils printed on the substrate.

In accordance with a further aspect of the present invention, an armature can be provided having no supporting substrate wherein the individual coils are chemically milled from a conductive material such as copper, silver or the like.

In accordance with another aspect of the present invention, the armature is a planar armature.

In accordance with still another aspect of the present invention the armature is a tubular armature.

In accordance with still a further aspect of the present invention, the last aforementioned tubular armature is a bi-curved armature so as to provide improved rigidity and constant field/armature gap distance with axial deflection of the impellor-rotor tip.

In accordance with still yet another aspect of the present invention, the armature is mounted on the peripheral ring of the impellor-rotor and an inductive coupler is provided for removing electrical power from the armature.

In accordance with still another aspect of the present invention the outer support structure of the fluid turbine incorporates a diffuser or shroud formed as a toroid having a fluid dynamic cross-section.

In accordance with still another aspect of the present invention the diffuser or shroud of the last aforementioned aspect incorporates an outer catenoid surface.

In accordance with still another aspect of the present invention the outer surface of the diffuser shroud can be other shapes specifically including a truncated conical outer surface and a parabaloid outer surface.

In accordance with still another aspect of the present invention the diffuser shroud includes means for passage of fluid therethrough, either for discharge along the inside surface of the diffuser shroud or for passageway across the space between the outer and inner support structures for discharge at the central support structure.

In accordance with still another aspect of the present invention at least the inner surface of the diffuser shroud is formed of a flexible material for flexure with fluid flow through the apparatus.

In accordance with still another aspect of the present invention the diffuser shroud of the fluid turbine includes at least certain surfaces made of flexible material and means for controlling the pressure inside the shroud.

These and other aspects, features and advantages of the present invention will be become more apparent upon a perusal of the following specification taken in conjunction with the accompanying wherein similar characters of reference refer to similar parts in each of the several views.

DESCRIPTION OF THE DRAWINGS

FIG. 3A is an enlarged cross-sectional front view taken along section line A—A of the FIG. 2 structure showing details of one embodiment of an armature/magnet configuration having a rotating planer armature and fixed field magnets.

FIG. 3B is an enlarged cross-sectional side view of the armature/magnet configuration of FIG. 3A.

FIG. 3C is an enlarged cross-sectional plan view of a first embodiment of the armature/magnet configuration of FIG. 3A.

FIG. 3D is an enlarged cross-sectional plan view of an alternative embodiment of the armature/magnet configuration of FIG. 3A.

FIG. 3E is an enlarged cross-sectional front view taken along section line A—A of the FIG. 2 structure showing details of a further embodiment of an armature/magnet configuration having rotating field magnet/keepers and a fixed planer armature.

FIG. 3F is an enlarged cross-sectional side view of the armature/magnet configuration of FIG. 3E.

FIG. 11 is an elevational sectional view of a bullet profile diffuser-shroud which provides central boundary layer control in accordance with a still additional aspect of the present invention.

FIG. 12 is a perspective view, partially broken away, of a catenary profile diffuser-shroud which provides central boundary layer control in accordance with a still further additional aspect of the present invention.

FIG. 13 is an elevational sectional view of a bullet profile diffuser-shroud which provides central and peripheral boundary layer control in combination.

FIG. 14 is a partial sectional view of an adjustable diffuser-shroud and associated turbo cage.

DESCRIPTION OF THE PREFERRED EMBODIMENT

As set forth above and hereafter in the specification and claims, the present invention relates in general to an axial flow fluid turbine alternator-generator assembly and parts thereof. The preferred embodiment is directed to a wind turbine generator as illustrated in FIGS. 1-2, 5A-5B and 15.

Figure 1:
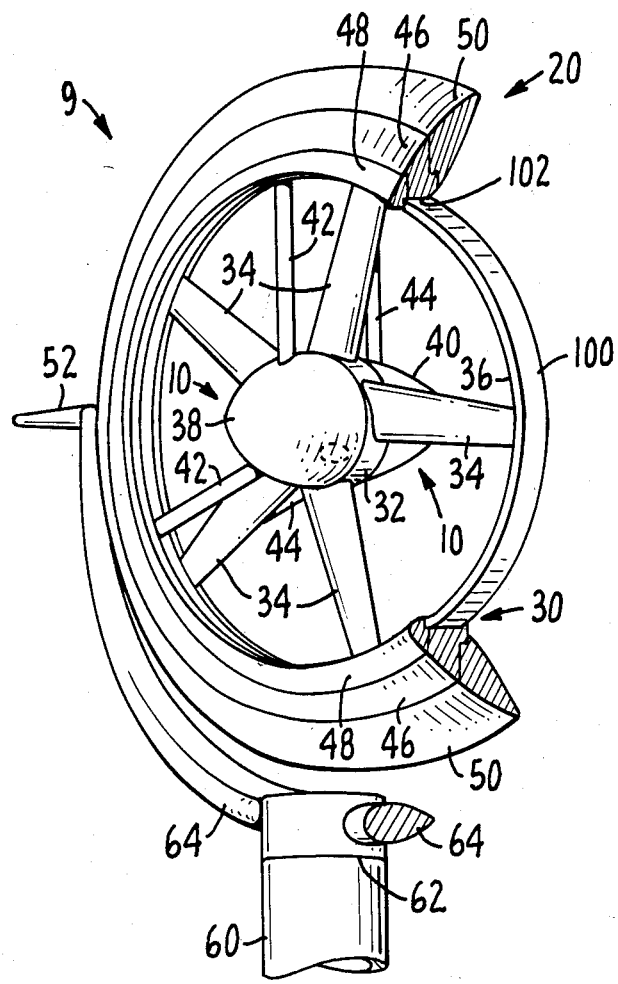
FIG. 1 is a perspective view, partially broken away, illustrating a preferred embodiment of the wind turbine of the subject invention.
Figure 2:
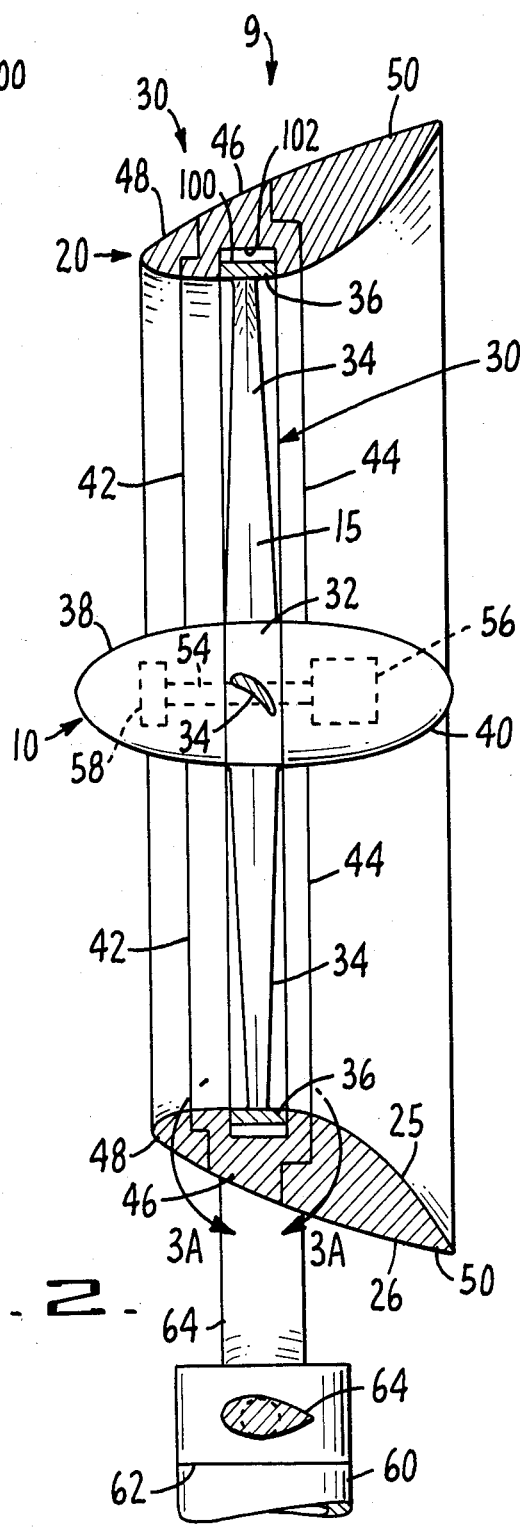
FIG. 2 is an enlarged elevational view, partially broken away, further illustrating the embodiment of FIG. 1.

Referring now to FIGS. 1-2 there is illustrated a diffuser augmented wind turbine 9 having a central support structure 10 rotatably supporting an impellor-rotor 15 and supported via a plurality of radially extending stanchions on an outer support structure or shroud 20 which is in turn gimbal mounted via gimbaled mast 64 which is connected via a rotatable joint 62 to the top of a tower 60 so as to be self aligning in the wind or any other flow stream.

The central support structure 10 includes fixed upstream and downstream faired bodies or body portions 38 and 40 respectively connected to stanchions 42 and fixed downstream stanchions 44 and rotatable supporting the impellor-rotor 15 therebetween. The impellor-rotor 15 has a central hub 32 connected via a plurality of circumferentially spaced-apart fluid dynamic blades 34 to a radial outward ring member 36. Each of the blades 34 has the shape of an airfoil, and in the preferred embodiment the airfoil blades have a positive angle of attack at the central hub 32 with respect to the fluid flow and a less positive angle of attack at the ring 36 with respect to the fluid flow.

The outer support structure 20 is made up of a plurality of separate members, including a central stator portion 46, an upstream inlet fairing 48 and a downstream diffuser shroud 50.

The turbocage 30 through which the fluid stream passes includes the central hub 32, the blades 34, the ring 36, the faired bodies 38 and 40, the stanchions 42 and 44 and the stator portion 46 of the outer support structure. The outer support structure 20 is mounted on a gimbaled mast 64 which is, in turn, supported on a tower 60. Gimbaled mast 64 permits the support structure to rotate about first and second orthogonal axes. The first axis coincides with longitudinal axis of mast 60 and intersects the axis of rotation of impellor-rotor 15.

Stabilizers in the form of fins or elevators 52 are provided on the outside of the outer support structure 20 for additional stability and air speed control. The center of pressure of the outer support structure is offset and downstream from the first axis of rotation of the structure on tower 60 so that the diffuser 50 will track the fluid stream. The turbocage and gimbaled mounting permit support of the wind turbine in various configurations such as, for example, by suspension from a suspension cable structure located in a high wind region across a valley.

The Stabilizers 52 are movable to tilt the turbine out of the fluid flow stream when overspeed of the impellor-rotor 15 is sensed in the manner described below.

Inside the central support structure 10 a rotor shaft 54 is provided for rotation with the rotor 15. The rotor shaft 54 is connected to a central body generator assembly 56 inside the downstream faired body 40 and a motor/tachometer overspeed sensor 58 is located in the upstream faired body 38. Overspeed rotation of the rotor 15 is sensed by the tachometer 58 and a control mechanism causes the stabilizer elevators 52 to turn and gradually tilt the outer support structure 20 out of the fluid flow stream.

As shown in FIGS. 1 and 2 the outer support structure 20 is shaped as a toroid having a generally catenoid inner surface 25 and a generally parabolic outer surface 26. The toroid airfoil creates a below-atmospheric pressure zone downstream while increasing the mass flow through the turbine. This nonrotating duct structure provides a diffuser section behind the rotor that produces power augmentation (typically 1.5 to 3 times). The duct also lowers the cut-in windspeed by raising the level of axial fluid velocity significantly. It also dampens gusts while improving the wake created by the machine.

The turbine 9 includes a rotor electrical generating element 100 and a stator electrical generating element 102 located respectively on the impellor ring 36 and the stator portion 46, of the outer support structure 20.

The subject invention preferably utilizes a monolithic armature construction having a low moment of inertia. As will be subsequently described, such an armature may be constructed in accordance with well-known printed circuit and chemical milling technology. The necessary magnetic field may be produced utilizing electromagnets or, preferably, permanent magnets.

In many applications, especially when the driving fluid is air, it is preferable that the rotor generating element 100 include the armature and that the stator element 102 include the relatively large mass magnets. The generator will then have a low moment of inertia so that the generator will be capable of rapidly responding to wind gusts and the like.

In other applications, it may be preferable that the rotor generating element 100 have a high moment of inertia so as to produce a flywheel action. By way of example, if output frequency is to be maintained constant, such flywheel action will tend to reduce rapid variations in the rotor speed. The inertia of the rotor will have the effect of weighing or damping the apparent velocity of the fluid flow. In that event, the rotor generating element 100 will comprise the field magnets and the stator generating element 102 will comprise the armature.

Referring now to FIGS. 3A–3D, a fluid turbine having a rotating armature and fixed field magnets is shown. The armature 104 is a planar armature having an armature substrate in the form of a ring or toroid. The inner periphery of the armature substrate is positioned within a groove formed in the rotating ring member 36. The armature substrate is fabricated from insulating materials including, for example, Fiberglass or Kapton brand materials. The armature windings are formed on the substrate utilizing well-known printed circuit manufacturing methods so as to provide a light weight monolithic structure.

A wide variety of windings can be utilized depending upon the desired electrical output. The windings may be arranged to provide a single phase output or a multiple phase output. In addition, the windings may be printed on one or both sides of the armature substrate. Multi-layer printed circuit board techniques may be used to provide a wide variety of armature configurations. Exemplary printed circuit type armatures suitable for use in the subject invention are disclosed in U.S. Pat. Nos. 2,970,238 and 3,624,439, the contents of which are hereby incorporated herein be reference.

As can best be seen in FIG. 3B, planar armature 104 is disposed between opposing field magnets 108. Magnets 108 are fastened to the interior sidewalls of a stator channel member 106. Member 106 is, in turn, positioned in the central stator portion 46 of the outer support structure of the turbine (FIGS. 1 and 2).

Opposing field magnets 108 are positioned a sufficient distance apart so as to provide a small air gap between both sides of the rotatable armature and the magnets. The poles of the facing magnets 108 are of opposite polarity so as to produce a flux path, represented by lines 105, which is normal to the surface of the armature and to the direction of movement of the armature windings 110. As can be seen in FIG. 3B, the polarity of magnets 108 along one side of the armature alternate. The field magnets may be configured as depicted in FIG. 3C such that two alternating magnetic poles are provided by a single magnet 108a. A central notch or cut out is formed in the center of magnets 108a so that the flux path will be concentrated at the extreme ends of the magnets, as represented by the flux line 105. Alternately, the magnets may be appropriately magnetized so as to concentrate the flux in the same manner.

An alternative field magnet configuration is shown in FIG. 3D. Relatively small magnets 108b are positioned along the interior of stator channel member 106 having alternating polarities. In this alternative configuration, channel member 106 acts as a keeper, i.e., flux guide, and is present in the flux path, as represented by line 105. Accordingly, member 106 is fabricated from a ferromagnetic material such as iron or an iron alloy such as Metglas brand material.

Conventional brushes and slip rings or the like (not depicted) can be utilized for removing the electrical energy produced in the rotating armature. Preferably, an induction coupler arrangement, as will be subsequently described, is used in lieu of brushes and other similar friction producing elements.

FIGS. 3E and 3F depict a further embodiment of an armature/magnet configuration having a rotating generating element 100 in the form of field magnets 116 and a stator generating element 102 in the form of a planar armature 112. Since the armature is not rotating, there is no requirement for brushes and the like.

Rotating element 100 includes a rotor channel member 114 which is an integral part of ring member 36. A series of spaced-apart rectangular recesses (not designated) are formed in one sidewell of member 114 for receiving individual permanent magnets 116. As can best be seen in FIG. 3F, magnets 116 are positioned within the recesses with alternating polarity poles facing the opposite sidewall of member 114. Two consecutive alternating poles may be provided by a single magnet having a central cut-out, as previously described in connection with the FIG. 3C embodiment. Alternatively, consecutive alternating poles may be produced by separate magnets, as discussed in connection with the FIG. 3D embodiment.

Stator generating element 102 includes a stator channel member 106 which is secured within the central stator portion 46 of the outer support structure in the same manner as the embodiment of FIGS. 3A-3D. A groove (not designated) is formed in the central area of bottom wall of channel member 106 for receiving the inner periphery of a planar armature 112. Armature 112 is similar in construction to armature 104 of the previously-described embodiments.

Armature 112 is disposed within the air gap formed between magnets 116 and the sidewall of rotor channel member 114 with member 114 serving as a keeper. A flux path, represented by lines 105, is produced which travels from the North pole of magnet 116 through armature 112 to the sidewall of channel member 114 on the opposite side of the armature. The path continues through the wall member to a location opposite an adjacent South magnetic pole. It should be noted that, as in the case of the other embodiments of the subject invention, the fluid dynamic blades are disposed outside of the flux path and may, therefore, be made from materials which are non-magnetic.

In the event a single magnet (FIG. 3C) provides two adjacent poles, the path continues through the armature and to the adjacent South pole and then through the magnet back to the North pole. If separate magnets are used for each pole (FIG. 3D), the flux path will extend back through the armature and continue through the adjacent magnet from the South to the North pole thereof, through the sidewall of member 114. The path continues back to the South pole of the first magnet and then through the first magnet to the North pole thereof, thereby completing the path. Inasmuch as member 114 functions as keeper and carries at least part of the flux in either embodiment, member 114 should be fabricated from a ferromagnetic material.

Figures 4A, 4B, 4C:
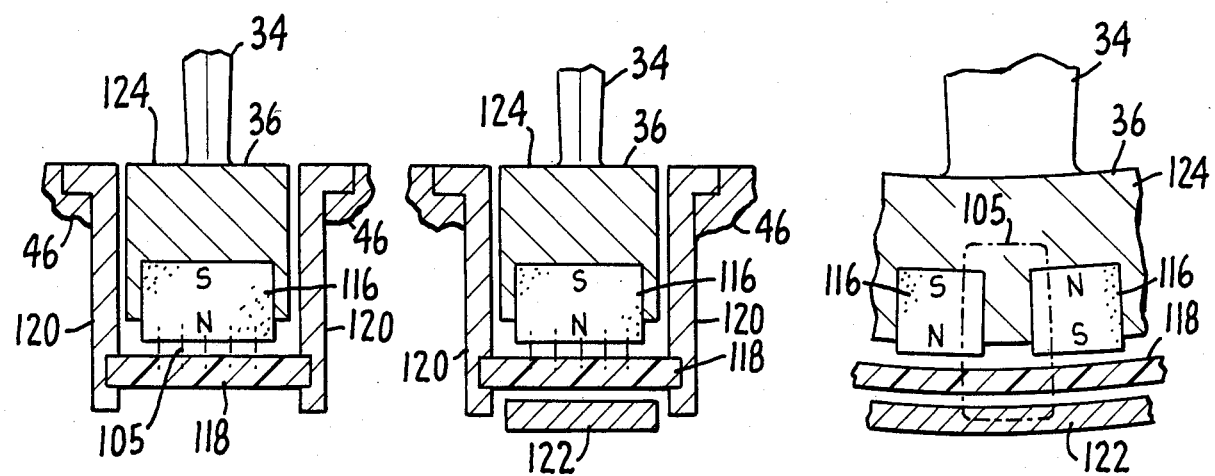
FIG. 4A is an enlarged cross-sectional front view taken along section line A—A of the FIG. 2 structure showing details of still a further embodiment of an armature/magnet configuration having rotating field magnets and a fixed mono-curved tubular armature.
FIG. 4B is an enlarged cross-sectional front view taken along section line A—A of the FIG. 2 structure showing details of a variation of the FIG. 4A embodiment wherein the rotating field magnets are provided with an associated non-rotating keeper.
FIG. 4C is an enlarged cross-sectional side view of the armature/magnetic configuration of FIG. 4B.

Referring now to FIG. 4A, a further embodiment of an armature/magnet configuration of the subject invention may be seen. This embodiment is similar to the embodiment of FIGS. 3E and 3F to the extent that the rotor generating element 100 includes the field magnets and the stator generating element 102 includes the armature.

A rotor field magnetic support member 124 is provided which forms an integral part of the outer periphery of ring member 36. A series of recesses are formed in member 124 for receiving permanent magnets 116. The magnetic axes of the magnets are radially aligned with the axis of rotation of the turbine impellor-rotor, with the magnetics being positioned around ring member 36 with alternating polarities.

A pair of spaced apart and opposing stator armature support members 120, mounted on central stator portion 46, are included for supporting a tubular armature 118. Tubular armature 118, like the previously-described planar armature 104, is preferably manufactured utilizing conventional printed circuit technology. An insulating substrate having a metalized layer is first prepared. The substrate is in the form of a narrow strip having a width equal to the desired width of the armature and a length equal to the desired circumference of the armature. The winding pattern is then produced on the substrate by etching away unwanted portions of the metalized layer. Examples of various windings will be subsequently described.

Once the armature windings have been etched, the narrow substrate is positioned over a circular mandrel having a diameter equal to that of the desired armature diameter. The free ends of the substrate are then secured together to form a continuous loop or tube. The final product is a lightweight monolithic tubular armature.

Referring back to FIG. 4A, a circular groove is machined on opposite sides of the inner walls of support member 120. The thickness of the grooves is slightly greater than the substrate thickness of the armature so that the armature is held securely in place.

The flux lines 105 produced by magnets 116 are generally transverse to the windings of the tubular armature. Accordingly, as the permanent magnets 116 rotate with the impellor-rotor, electrical energy is produced in the tubular armature 118.

A further variation of the FIG. 4A embodiment of the subject invention is shown in FIGS. 4B and 4C. This embodiment is similar in construction to the FIG. 4A embodiment except that a fixed tubular keeper (flux guide) 122 extends around and is slightly spaced apart from armature 118. Keeper 122 is rigidly secured within central stator portion 46.

As can best be seen in FIG. 4C, the flux path, represented by lines 105, extends from the North pole of a first magnet 116 and through tubular armature 118 to keeper 122. The path continues through the keeper to a location opposite the South pole of the adjacent magnet 116. The flux passes again through armature 118 and enters adjacent magnet 116 through the South pole, thereof, and to the North pole. The flux then travels from the North pole, through support member 124, and back to the South pole of the first magnet.

Figures 4D, 5A:
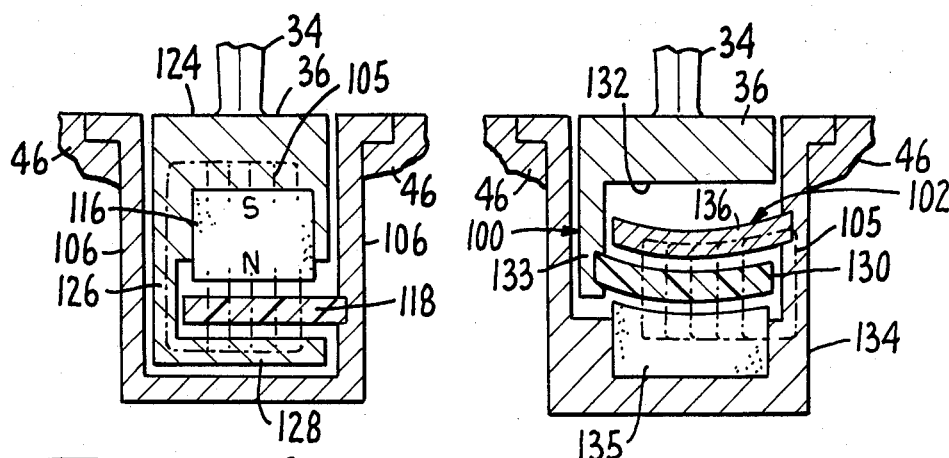
FIG. 4D is an enlarged cross-sectional front view taken along section line A—A of the FIG. 2 structure showing details of a further variation of the FIG. 4A embodiment wherein the rotating field magnets are provided with an associated rotating keeper.
FIG. 5A is an enlarged cross-sectional front view taken along section line A—A of the FIG. 2 structure showing detail of an additional embodiment of an armature/magnet configuration having a rotating bi-curved tubular armature and fixed field magnets and an associated fixed bi-curved keeper.

A variation of the FIGS. 4B-4C embodiment is depicted in FIG. 4D. A stator channel member 106, similar to member 106 of the FIG. 3A embodiment, is secured to central stator portion 46. A circular groove is formed in the lower portion of the inner sidewall of member 106 for receiving a tubular armature 118 to form the stator generating element.

The rotor generating element includes a rotor field magnet support member 124 which forms an integral part with ring member 36. A channel 126 is formed almost the entire width of member 124 so as to form a flange 128 which forms part of the keeper. A series of adjacent recesses are formed in the sidewall of channel 126, opposite flange 128. Permanent field magnets 116 are positioned within the recesses, with the axes of the magnets being radially disposed with respect to the axis of rotation of the impellor-rotor. Adjacent magnets 116 have opposite polarity poles facing channel 126. Tubular armature 118 is positioned within channel 126 with a small air gap being formed between the armature and the field magnets.

Figure 4E:
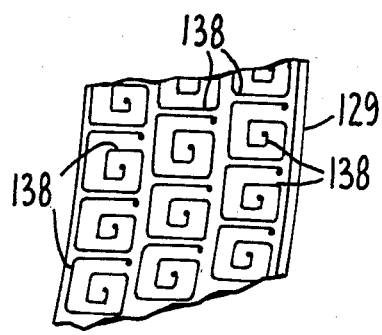
FIG. 4E is a fragmentary view of a section of the tubular armature of FIG. 4D showing exemplary three-phase squaril windings.

FIG. 4E shows a section of the tubular armature utilized in the FIG. 4D apparatus depicting exemplary armature windings. The individual printed windings 138 are in three circumferential rows. The windings in a row may be connected either in series or in parallel, depending upon the desired electrical output. The individual windings shown are referred to as squaril windings. The term squaril winding, as used herein, refers collectively to a spiral-type of winding having either a generally rectangular shape or a generally square shape. In the event the squaril winding is to have a generally rectangular shape, linear conductor segments make up the coil in a manner such that, if proceeding from the coil center, each coil segment is long enough to round the previous segment by the gap width between adjacent turns, so as to maintain uniform spacing of the coil segments. Each segment is positioned at 90 degrees to the previous segment, producing a right or left hand turn oriented coil. Coils can be combined in parallel or in series as required.

In the event the squaril winding is to have a generally square shape, the linear conductor segments make up the coil in a manner such that, if proceeding from the coil center, the first segment is two conductor widths in length, the second segment is two conductor widths plus one gap width and the third segment is equal to the previous segment plus one conductor width. Each additional segment length is equal to the previous length plus one gap length added to every even segment and one conductor width added to every odd segment thus increasing the conductor segment lengths moving out to the coil periphery. Each segment is positioned at 90 degrees to the previous segment, producing a right or left hand turn oriented coil. Coils can be combined in parallel or in series as required.

Other windings could also be used such as spiral windings and serpentine windings. Spiral windings are similar to squaril windings except that the individual turns are generally circular rather than square. An advantage of squaril windings over spiral windings for generally tubular geometry armatures is that all of the available area can be filled by conductor material. Exemplary serpentine windings will be subsequently described.

The three circumferential rows of winding 138 provide a three-phase electrical output. The position of the coils in one row is typically shifted with respect to the coil in an adjacent row such that electrical outputs of the rows differ in phase by 120 degrees. Fewer or greater numbers of rows can be utilized to decrease or increase the number of phase-shifted outputs, as desired.

The flux path 105 of the FIG. 4D embodiment is similar to that of the FIG. 4C embodiment. The principal distinction is that keeper 122 of the FIG. 4C embodiment is stationary, whereas keeper 128 of the FIG. 4D embodiment rotates with the field magnets 116.

The tubular armatures 118 depicted in FIGS. 4A–4D can be referred as mono-curved tubular armatures inasmuch as the cross-sections of the armatures are curved in the plane normal to the impellor-rotor axis of rotation and are flat in the plane parallel to the axis of rotation. The rigidity of a tubular armature can be improved substantially by curving the cross-section in both planes. One such armature, referred to as a bi-curved tubular armature, is depicted in the embodiment of FIGS. 5A and 5B and is the preferred embodiment armature.

The bi-curved tubular windings are manufactured in substantially the same manner as the mono-curved windings utilizing conventional printed circuit technology. A substrate having a metalized layer is first prepared having a width equal to the desired width of the tubular armature and a length equal to the circumference of the armature. Once the winding pattern has been etched, the strip is passed over a curved mandrel having a radius of curvature equal to the desired radius of curvature of the cross-section of the armature in the plane parallel to the axis of armature rotation.

Once the strip has been passed over the curved mandrel, thereby imparting an arcuate shape across the width of the strip, the strip is then positioned over a circular mandrel in the same manner as the mono-curved tubular armature. The two ends of the strip are then secured together, thereby completing the construction of the armature.

Figure 5B:
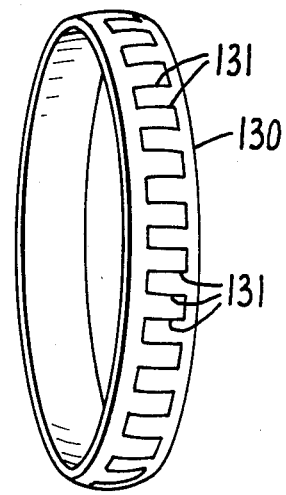
FIG. 5B is a perspective view of the bi-curved tubular armature of FIG. 5A showing an exemplary single phase serpentine winding.

The printed winding 131 depicted in FIG. 5B is a serpentine winding. Although only a single phase winding is shown, additional windings could be used to provide a multi-phase output. The additional windings may be positioned adjacent one another as depicted in the FIG. 4E armature. Alternatively, the windings may be superimposed over one another utilizing multi-layer printed circuit fabrication techniques. This approach may also be utilized in connection with the previously described mono-curved tubular armatures and the planar armatures. Other winding configurations could also be used.

Referring back to FIG. 5A, the bi-curved armature 130 forms part of the rotor generating element 100. The periphery of the armature is received in a circular groove formed in a flange 133. Flange 133 extends away from an armature support member 132 which forms an integral part of ring member 36.

The stator generating element 102 includes a stator channel member 134 secured to the central stator portion 46. The bottom portion of member 134 is provided with a series of recesses for receiving field magnets 135 having alternating polarity poles facing armature 130. Magnets 135 preferably have an arcuate surface facing armature 130 with a radius of curvature equal to the cross-sectional radius of curvature of the armature so that an air gap is formed between the magnets and the armature which is uniform across the width of the armature.

A keeper flange 136 is mounted on a sidewall of member 134 which extends substantially across the full width of armature 130. Keeper flange 136 has an arcuate cross-section so as to maintain a uniform flux path across the width of the armature. Keeper flange 136 could be replaced with a magnet array similar to that depicted in FIG. 3A.

The FIG. 5A construction inherently compensates for flexing which occurs when the impellor-rotor is loaded. Such flexing tends to cause the armature 130 to pivot normal to plane of impellor-rotor rotation towards one or the other sidewall of channel support member 134. As a result of the arcuate cross-sections of armature 130, keeper flange 136 and magnets 135, the flux path remains relatively constant in the presence of such impellor-rotor pivoting.

As previously noted, electromagnets may be utilized in lieu of permanent field magnets. In the event the electromagnets form part of the rotor generating element, the windings of the electromagnets are preferably supported by a tubular substrate similar to the substrate of the previously-described tubular armatures. Similarly, the windings of the electromagnet are preferably squaril windings, although other windings such as spiral windings could be used.

Figures 6, 7, 8:
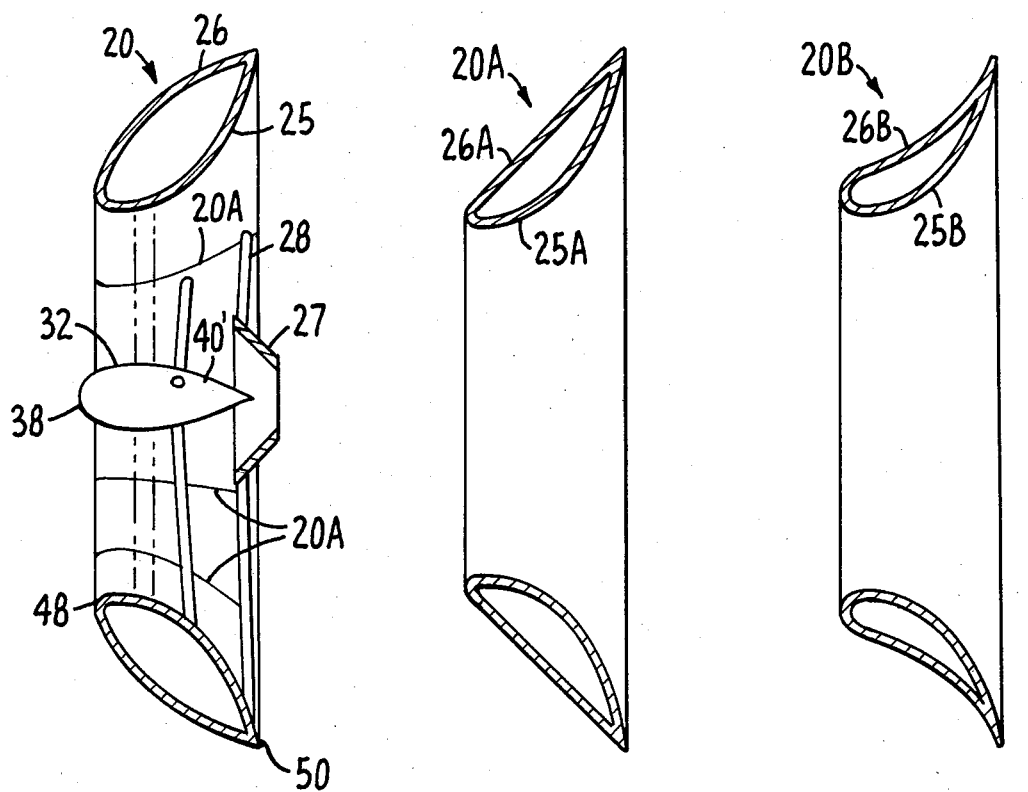
FIG. 6 is an elevational sectional view of a bullet profile diffuser-shroud as depicted in the present embodiment wind turbine of FIGS. 1 and 2 further including a concentrator structure.
FIG. 7 is an elevational sectional view of a conical profile diffuser-shroud in accordance with still another aspect of the present invention.
FIG. 8 is an elevational sectional view of a catenary profile diffuser-shroud in accordance with a further aspect of the present invention.

While the outer support structure or shroud 20 can be solid as shown in FIGS. 1–2, it can also be hollow as shown in FIG. 6. The upstream inlet fairing 48 and downstream shroud 50 can be circumferentially segmented along gore lines 20A for assembly of large turbines. Also as shown in FIG. 6, a concentrator in the form of a hollow truncated cone 27 supported on stanchions 28 can be positioned downstream of the modified downstream body portion 40'. The concentrator accelerates the central core wake, postponing diffuser stall. Although stanchion 28 is shown supported on the outer support structure, it can alternatively be supported by body portion 40'.

The FIGS. 1 and 2 embodiment shroud has a bullet-shaped profile, which is the presently-prefered profile. This profile provides reduced overall drag. The convex catenoid inner surface 25 expands the air as the air flows over the surface, thereby causing the air pressure at the downstream portion of the surface to decrease below atmospheric pressure.

As the air travels over the outer convex parabolic surface 26 toward the trailing edge, the air velocity increases while the air pressure decreases. The decreasing air pressure of the outer surface pulls the interior air mass away from the center of the diffuser, thereby providing the desired lower air pressure.

FIG. 7 shows another configuration for the outer support structure or diffuser/shroud 20A. Shroud 20A has a convex catenoid inner surface 25A similar to that of FIGS. 1–2 and 6. The outer surface 26A is in the form of a truncated core. One advantage of this construction is reduced construction costs.

FIG. 8 depicts still a further configuration of the diffuser shroud 20B. Diffuser/shroud 20B has a convex catenoid inner surface 25B similar to that of FIGS. 1–2, 6 and 7 and a concave catenoid exterior surface 26B. The concave outer surface 26B causes the air pressure to increase as the air moves along the surface, thereby slowing the air flow. The pressure increase is vented into the interior at critical boundary layer separation points so as to increase the interior flow velocity and prevent diffuser stall.

Figures 9, 10:
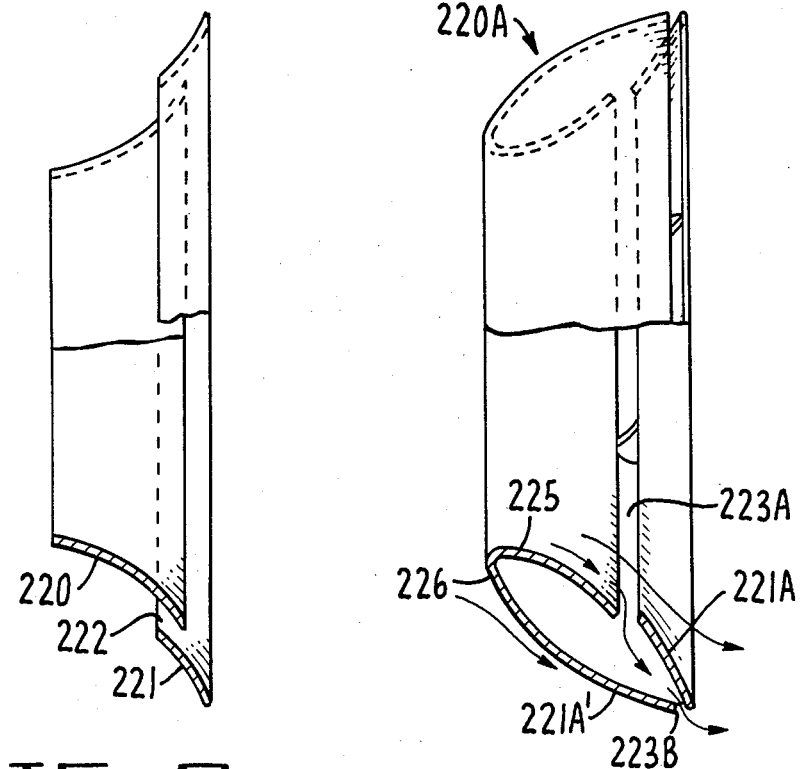
FIG. 9 is an elevational partial sectional view of a single wall catenary profile diffuser-shroud having an associated slot ring in accordance with still a further aspect of the present invention.
FIG. 10 is an elevational sectional view of a diffuser-shroud which provides peripheral boundary layer control in accordance with an additional aspect of the present invention.

Alternatively, the shroud can be formed of a single member of uniform cross section, as the shroud 220 shown in FIG. 9, wherein the shroud shape is generally a catenoid. This shroud is easier and less expensive to manufacture than certain other configurations disclosed.

FIG. 9 also illustrates the addition of an outside diffuser shroud segment 221 spaced by a slot ring 222 surrounding the downstream end of the shroud 220 and shaped generally as a catenoid for boundary layer, flow separation, control at the downstream end of the shroud 220. This shroud segment 221 and slot ring 222 introduces high velocity air into the downstream end of the shroud to increase the velocity within the shroud.

FIG. 10 shows an alternative configuration for the shroud 220A having inside and outside surfaces 225 and 226 similar to the surfaces 25 and 26 of FIG. 6. A curved shroud segment 221A supported by a plurality of webs 221A' provides a gap 223A at critical boundary layer separation points of inner surface 225 and a gap 223B at the downstream end of outer surface 226 so that boundary layer fluid can flow into gap 223A and out gap 223B. This gap or slot provides a further improvement of boundary layer control of the diffuser wall and results in increased low pressure and best augmentation.

In accordance with another aspect of the present invention the diffuser shroud can be vented to postpone, suppress or eliminate the stalled condition in operation by injecting or passing fluid through the shroud wall.

Fluid carried outside the principal inlet opening into the turbocage is carried into and through the turbocage with a major portion discharged at the downstream end of the central support structure. FIGS. 11–13 illustrate alternative ways of conducting this fluid. In accordance with the embodiment illustrated in FIG. 11 passages 329 are provided through the shroud from the outer surface 326 to the inner surface 325 for passage of fluid therethrough and along the inner surface 325, and passages 345 are provided through the shroud surfaces 326 and 325 and within the hollow support stanchions 344 for venting axially out of the downstream end of the downstream body portion 340 of the central support structure 310. The hollow support stanchion flow postpones central core stall.

Alternatively, as shown in FIG. 12, a hollow annular chamber 329A is provided between the inner and outer surfaces 325A and 326A respectively of the shroud 320A and communicates with passages 345A through hollow stanchions or ventilator tubes 344A for conveying fluid injected into the annular chamber 329A near the radial outward portion of the upstream inlet fairing of the outer support structure 320A and leading to the inlet to the hollow stanchion 344A.

FIG. 13 illustrates a shroud-turbocage structure that combines features of the shroud segment 221A of FIG. 10 with the vented [shroud structure 320] hollow support stanchions 344 of FIGS. 11 and 12. The ventilator tubes accelerate the central core wake and postpone the diffuser stall as in the FIG. 11 embodiment and the slot provides the diffuser wall boundary layer control enhancement of the FIG. 10 embodiment.

As shown in FIG. 14 the diffuser shroud 420 can be hollow and the inner and/or outer surfaces 425 and 426 of the shroud formed of a flexible material for flexure with fluid flow through the apparatus. As showh in FIG. 14 both the inner and outer surfaces 425 and 426 respectively are formed of a flexible material such as, for example, polyvinylchloride, supported on a frame structure 429 whereby the surfaces of the diffuser shroud can flex to conform to the changing conditions as the fluid velocity through the shroud increases or decreases such that the stall condition is postponed, suppressed or eliminated.

It is even possible to control the pressure inside a hollow shroud having a flexible surface material such that the configuration of the surface will change depending upon the relationship of the pressure within the shroud relative to the pressure on the outside surface of the shroud. The pressure inside the shroud 420 can be changed in accordance with different operational characteristics of the turbine measured such as by the speed of the rotor or the pressure sensed at the surface of the shroud.

Figure 15:
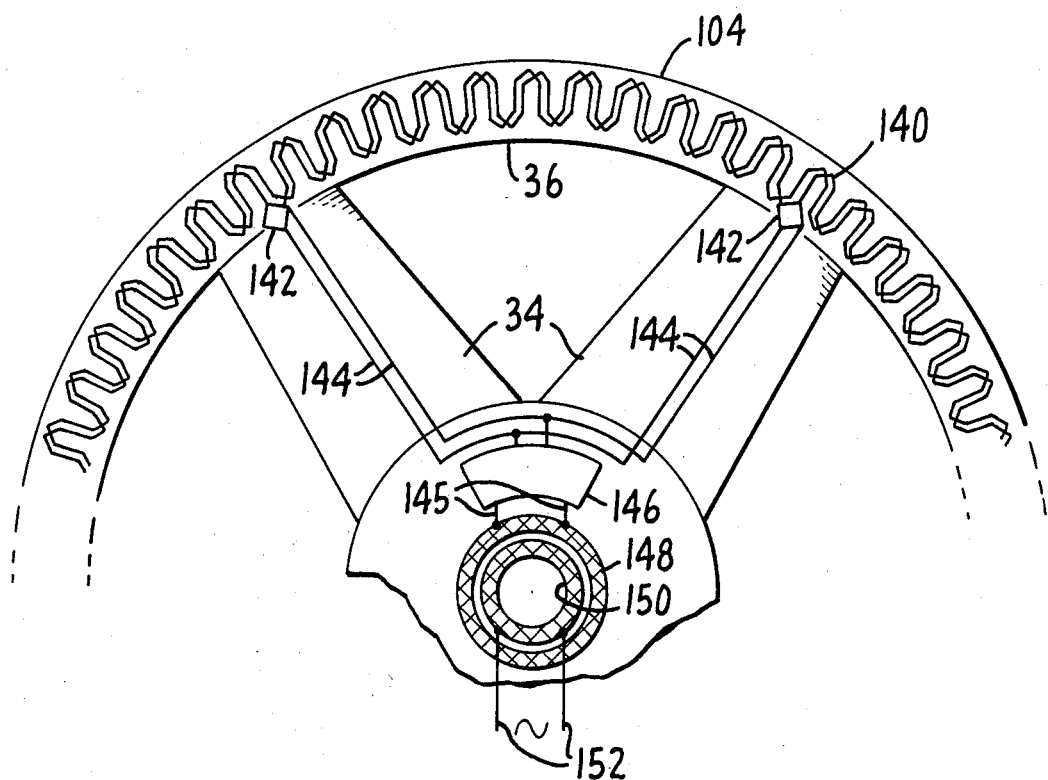
FIG. 15 is a fragmentary side view of an impellor-rotor showing an armature winding and associated inductive coupler.

As previously described, in the event rotor generating element 100 includes the armature, it is necessary to utilize brushes or the like to transfer electrical energy from the armature to a non-rotating environment. FIG. 15 shows a planar armature 104 forming part of a rotor generating element and associated structure in combination with an inductive coupler device for transferring electrical energy.

Armature 104 is a planar armature having a pair of printed serpentine windings 140. The field magnets, which form part of the stator generating element 102, are not depicted. The planer armature is supported on a ring member 36 which is, in turn, supported by impellor-rotor blades 34.

A rectifier circuit 142, such as a diode bridge, is provided for each of the winding phases 140. The rectifier circuits 142 convert the A.C. outputs of winding 104 to D.C. The outputs of the two rectifier circuits are connected in parallel by conductors 144 which are supported by blades 34. Conductors 144 carry the D.C. output to the input of a conventional inverter circuit 146 located near the axis of rotation of the impellor-rotor.

Inverter 146, which can be powered by the D.C. input, converts the D.C. input to a relatively high frequency A.C. power which appears on inverter output lines 145. Lines 145 are connected to the rotating primary winding 148 of an inductive coupler, with the coupler being equivalent to a power transformer. Inverter 146 and the associated rectifiers can be deleted in the event, for example, the output frequency is within a range to provide efficient coupling through the inductive coupler. However, the inverter permits the output frequency and voltage amplitude to be readily controlled.

The secondary winding 150 of the inductive coupler is mounted on the non-rotating portion of the structure, encircled by the rotating primary winding 148. The relatively high frequency A.C. power output of the secondary winding, on lines 152, can then be utilized, as desired.

Figure 16:
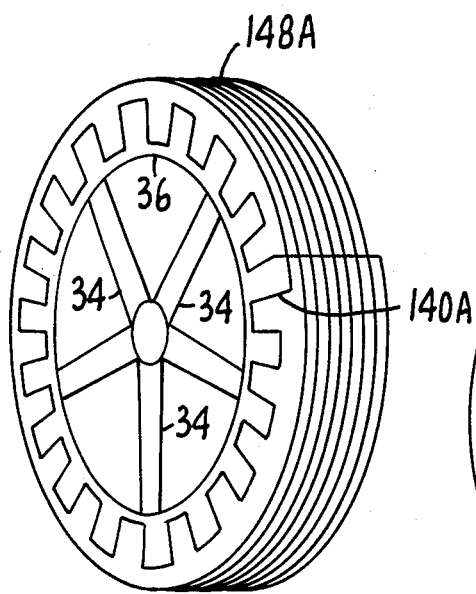
FIG. 16 is a schematic illustration of a perspective elevational view of an impellor-rotor depicting an armature winding and associated transverse inductive coupler primary winding.

FIG. 16 is a schematic drawing of another armature structure and associated apparatus utilizing an inductive coupler. The configuration includes a planar armature mounted on a rotating ring member 36 which is, in turn, supported on impellor-rotor blade 34. The planar armature includes a single serpentine winding 140A although other winding arrangements may be utilized.

The FIG. 16 apparatus further includes a winding 148A which forms the primary of an inductive coupler. Winding 148A is printed on a substrate similar in construction to the substrates of the previously-described tubular armatures utilizing printed circuit technology. Accordingly, the substrate of the planar armature is generally orthogonal with respect to the inductive coupler primary winding substrate.

Primary winding 148A of the FIG. 16 configuration is in the form of a spiral having a diameter equal to the outer diameter of the armature. Armature winding 140A and primary winding 148A are inductively coupled with the secondary winding (not depicted) being positioned on the stator element and encircling the primary winding. An inverter, associated rectifiers and other power circuits can be added.

Figure 17:
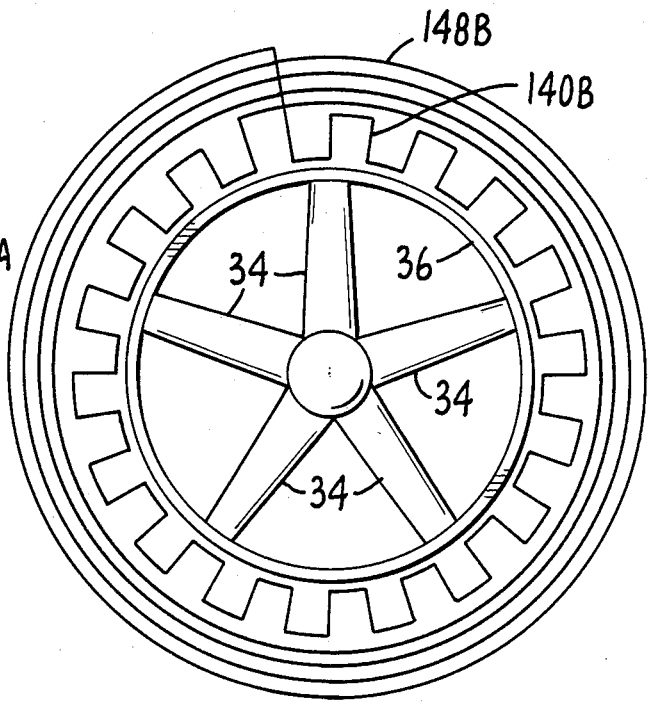
FIG. 17 is a schematic illustration of a front view of an impellor-rotor depicting an armature winding and inductive coupler primary winding which are coplanar.

The orthogonal relationship between the armature winding 140A and primary winding 148A minimizes the coupling between the two elements thereby reducing distortion on the power output. FIG. 17 shows an alternative configuration where the armature windings 140B and primary winding 148B of the inductive coupler are printed on a common planar substrate. Again, the armature winding and primary winding are connected in parallel. The stationary secondary winding (not depicted) is positioned adjacent the rotating substrate which carries the armature and primary windings. An inverter, associated rectifiers and other power circuits can be added.

Figure 18:
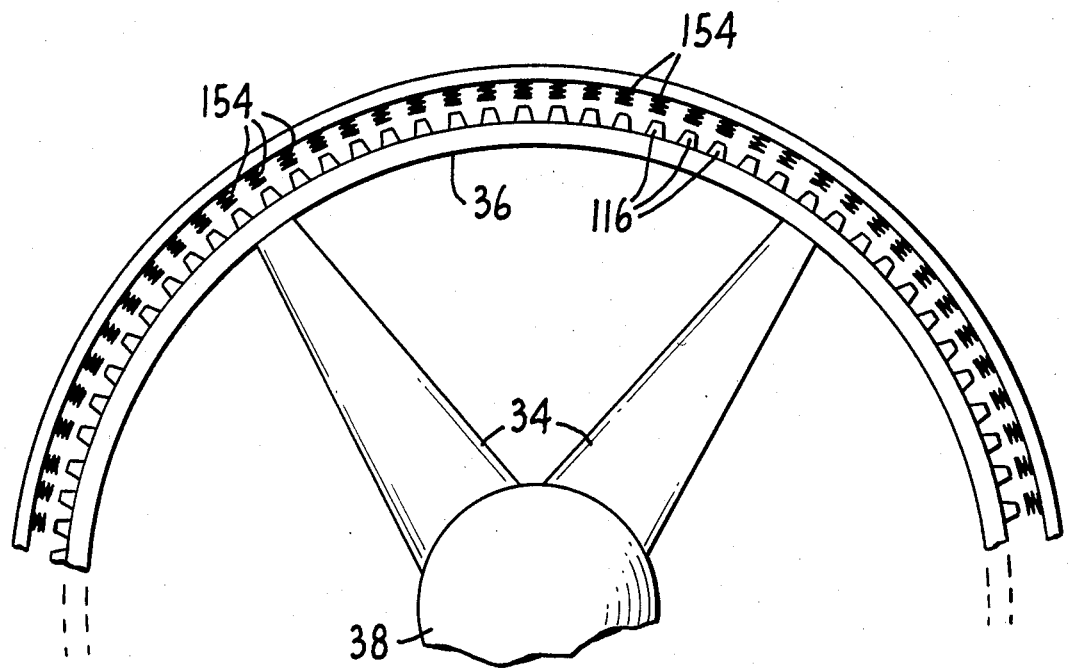
FIG. 18 is a fragmentary front view of an impeller-rotor carrying a plurality of field magnets and a plurality of associated coils which form a stationary armature.
Figure 19:
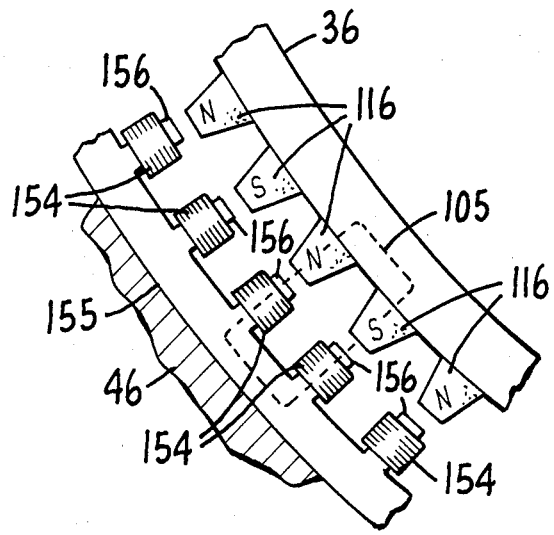
FIG. 19 is an enlarged fragmentary view of the structure of FIG. 18 showing the relative positions of the armature coils and field magnets.

FIGS. 18 and 19 show a further stator/rotor configuration having a rotor generating element which carries a series of spaced-apart permanent magnets 116 and a stator generating element which includes an armature comprised of a series of coils 154. Magnets 116 are secured to ring member 36 which is supported by impellor-rotor blades 34.

Magnets 116 are positioned with alternating polarity poles facing armature coils 154. In order to minimize detent, starting torque and cogging, the spacing of the magnets and coils is such that all magnets and coils are never simultaneously facing one another at any rotational position of the impellor-rotor. This is true in all embodiments of the subject invention.

Coils 154 are wound around pole pieces 156 which form an integral part of a circular keeper 155. Keeper 155 is, in turn, supported on central stator portion 46.

Figure 20:
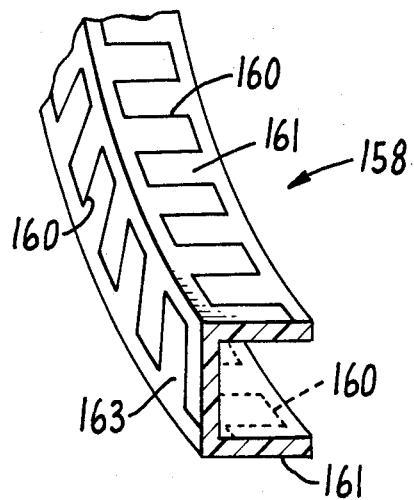
FIG. 20 of an alternative embodiment armature assembly having three serpentine windings and a channel for receiving a field magnet structure which rotates relative to the armature assembly.

In addition to planar and tubular armatures, the subject invention may be implemented utilizing a channel armature generally designated by the numeral 158, as depicted in FIG. 20. Channel armature 158 is preferably produced utilizing printed circuit fabrication techniques. The armature has a U-shaped cross-section which is defined by spaced-apart parallel members 161, and intermediate member 163 which bridges members 161. Parallel members 161 are preferably constructed in the same manner as the previously-described tubular armature 118 and bridging member 163 is preferably in the same manner as the previously-described planar armatures 104 and 112.

Parallel members 161 and bridging member 163 each carry a printed winding 160. In the configuration depicted in FIG. 20, serpentine windings are used which are positioned relative to one another so as to provide a three-phase output, with each phase shifted 120 degrees from the remaining two phases.

A field magnet array (not depicted) is disposed within the channel formed by elements 161 and 163 of armature 158. The magnets are arranged to provide alternating flux paths which are normal to the surfaces of elements 161 and 163. Keepers may also be included. Armature 158 may be utilized as part of either the stator generating element or the rotor generating element.

Figure 21:
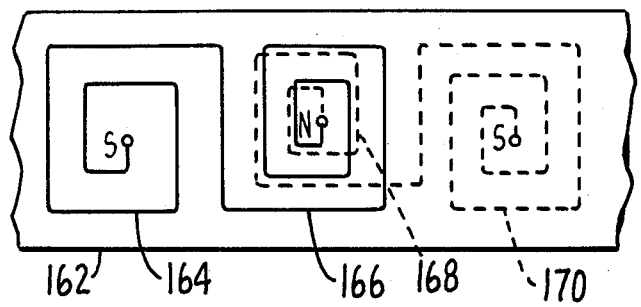
FIG. 21 is a plan view of a section of a tubular armature having an exemplary squaril windings printed on the inner and outer surfaces of the armature.

FIG. 21 depicts a further exemplary armature winding configuration which may be utilized in connection with the previously-described armatures. Each winding segment is comprised of a total of four separate squaril windings connected in series.

A first squaril winding 164 is printed on a first side of the armature substrate. A second squaril winding 166 is located adjacent winding 164. Winding 166 is also printed on the first side of the substrate, but the direction of winding 166 is opposite to that of winding 164. A third winding 168 is printed on the second side of the substrate, opposite winding 166. Winding 166 and 168, which have the same turn direction, are connected together through the substrate. A fourth winding 170 is printed on the second side of the substrate, adjacent winding 168. Winding 170 is connected to winding 168 with the turns being wound in opposite directions.

The field magnets used in connection with the FIG. 21 winding configuration are positioned with adjacent magnets having opposite polarity poles facing the armature. For the armature/magnet position depicted in FIG. 21, the flux path extends from the north pole of the magnet facing windings 166 and 168, through the two windings and back through winding 164 to the south pole of the magnet opposite winding 164. Similarly, a second flux path extends from the north pole of the magnet opposite windings 166 and 168, through the two windings, and back through winding 170 to the south pole of the magnet opposite the winding.

Figure 23:
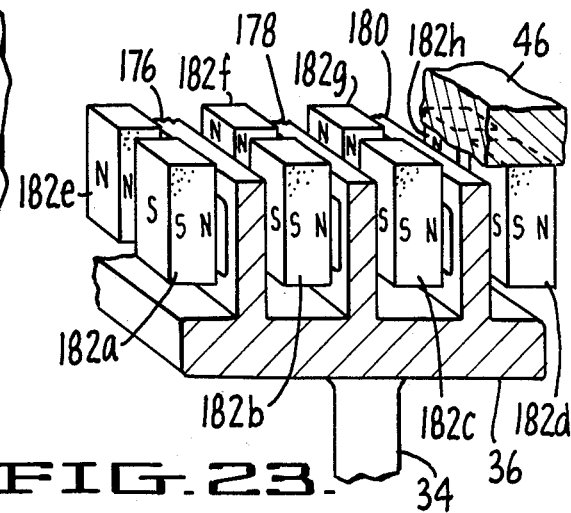
FIG. 23 is a perspective view of a section of an impellor-rotor carrying three planer armatures and associated fixed field magnets.

A still further armature/field magnet configuration of the subject invention is shown in FIG. 23. The FIG. 23 configuration is adapted to provide a three-phase output. Three spaced-apart planar armatures 176, 178 and 180 are coaxially mounted on a ring member 36 which is secured to blades 34 of the impeller-rotor. An array of permanent field magnets is positioned on the central stator portion 46 adjacent the planar armatures.

A first circumferentially aligned set of magnets, including magnets 182a and 182e, are positioned adjacent armature 176. The magnets are positioned with alternating polarities. A second set of magnets, including magnets 182b and 182f, are positioned between armatures 176 and 178. The magnet of the second set are also of alternating polarity, with the polarity of the magnets being opposite to that of adjacent magnets of the first set.

A third set of alternating polarity magnets, including magnets 182c and 182g, is disposed between armatures 178 and 180. A fourth and final set of alternating polarity magnets, including magnets 182d and 182h, is positioned adjacent armature 180, opposite the third set of magnets. The magnets of the third set are positioned with polarities opposite to the magnets of the second set and the magnets of the fourth set are positioned with polarities aligned in the same manner as the second set magnets and opposite to that of the third set.

Magnets 182 produce a flux path which is transverse to the planar armature. An exemplary path starts at the North pole of magnet 182a and extends through armature 176 to the South pole of magnet 182b. Then from the North pole of magnet 182b path continues through armature 178, through magnet 182c, through armature 180 to magnet 182d. The path then turns and enters the South pole of magnet 182h. The path passes through magnet 182h, armature 180, magnet 182g, armature 178 and through magnet 182f. The path continues through armature 176, magnet 182e and back to magnet 182a.

As previously noted, the peripheral generator formed by rotor generating element 100 and stator generating element 102 (FIGS. 2 and 25) produces a significant power output at relatively low rotational velocities without the use of gears and the like. Centerbody generator 56 produces significant power output at relatively higher rotational velocities.

Preferably, apparatus is provided (not depicted) to sense when the peripheral generator has reached its rated power output. Such output is typically the point at which any further increase in power is likely to exceed design limitations. Once the predetermined output is sensed, the field of the centerbody generator 56 is activated thereby loading down the rotor while increasing the total power output without damaging the turbine. The apparatus could also monitor fluid velocity for the purpose of controlling centerbody generator 56.

Figure 22:
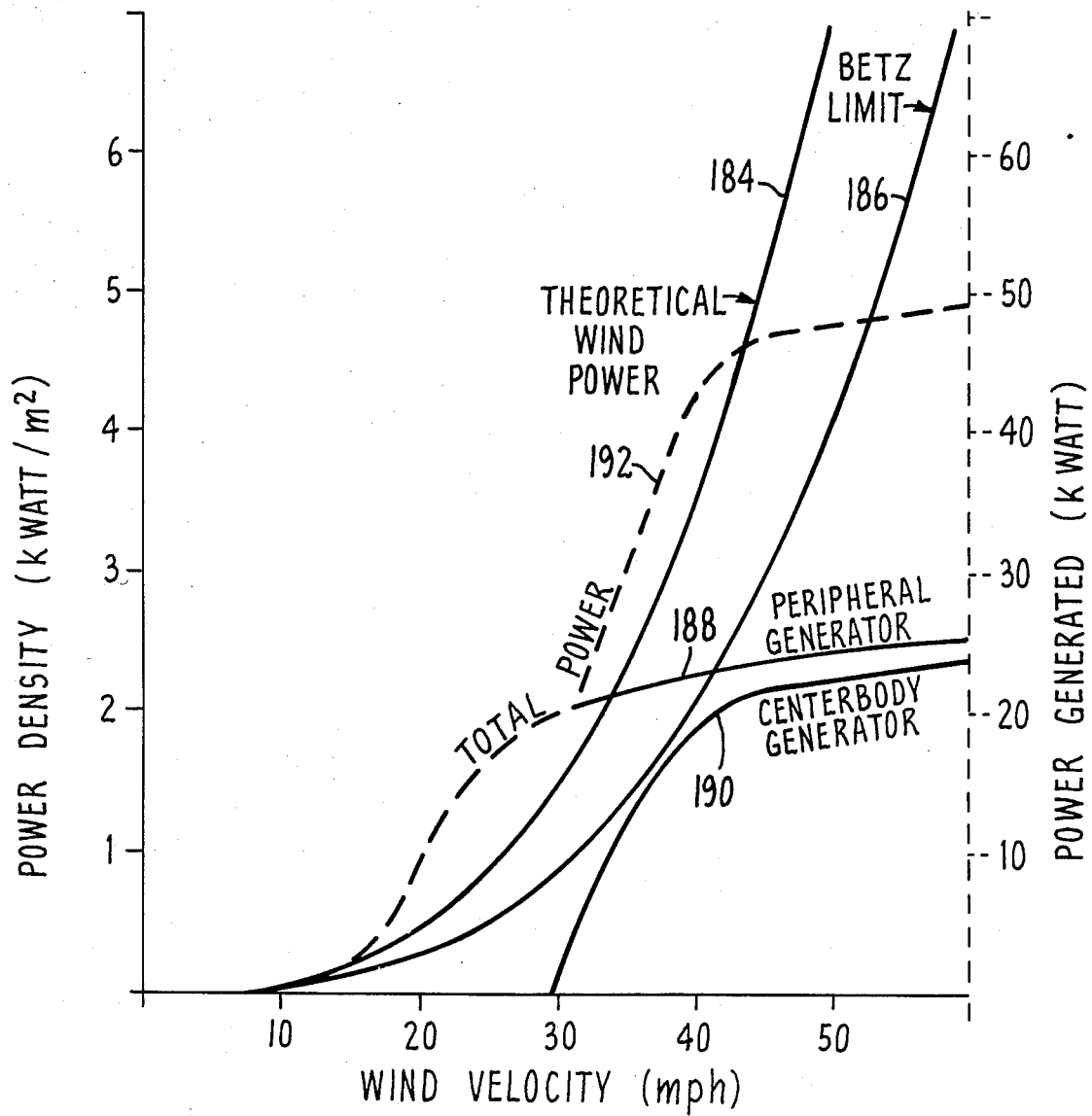
FIG. 22 is a graph depicting the relative outputs of a periphery and centerbody generators of a wind turbine for varying wind velocities.

The graph depicted in FIG. 22 further illustrates the combined effects of the peripheral and centerbody generators for a wind-powered turbine. The left-hand vertical axis represents the power density of the wind in units of kilowatts per square meter. The right-hand vertical axis represents the power output of the two turbine generators in kilowatts. The horizontal axis represents the wind velocity in miles per hour.

Curve 184 indicates the theoretical power density of the wind for varying wind velocities. Curve 186 represents the maximum power density which can be extracted from the wind utilizing an un-shrouded or non-augmented wind turbine in accordance with the previously noted Betz limit.

Exemplary peripheral generator and centerbody generator power outputs for varying wind velocities are represented by curves 188 and 190, respectively. It can be seen for the two curves that the peripheral generator output is greater than that of the centerbody output, especially for lower wind velocities. Curve 192 represents the sum of the power produced by the two generators.

The FIG. 22 graph shows the generator outputs when both generators are permanently engaged. As previously noted, it is preferably that the centerbody generator be disengaged until the peripheral generator output reaches a predetermined rated power output level. In the example depicted in the graph, overall efficiency will be achieved if the centerbody generator remains inactive until the wind velocity reaches approximately 30 miles per hour.

Figure 24:
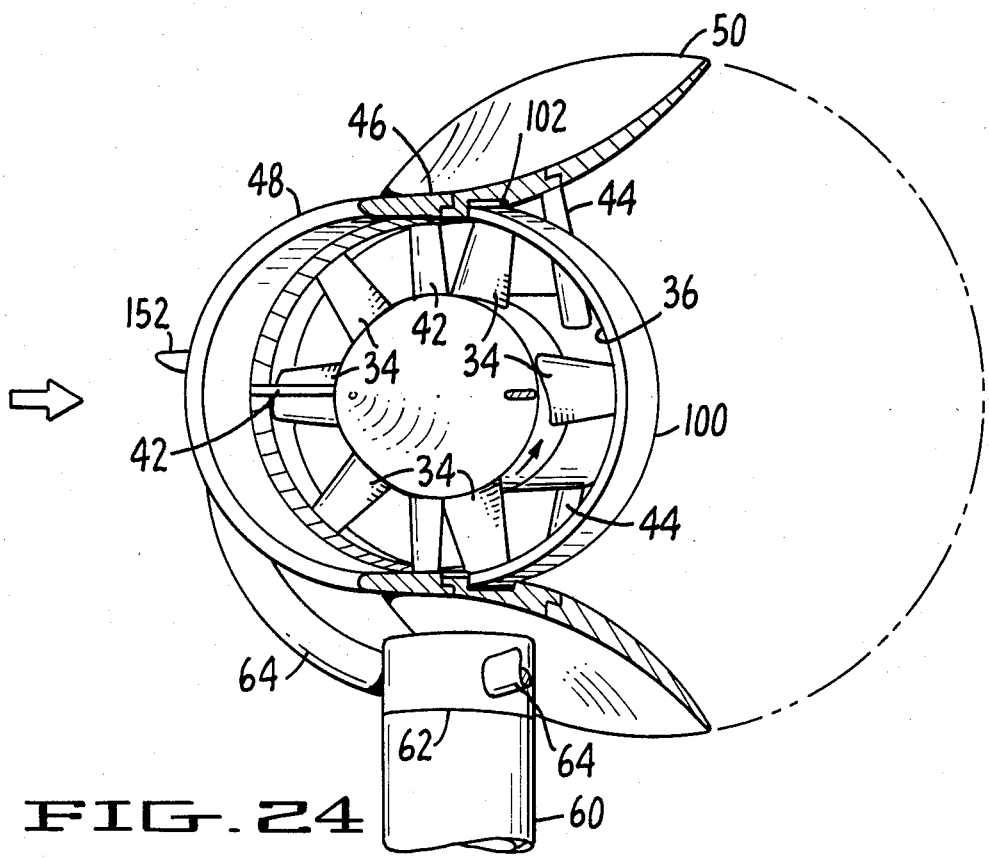
FIGS. 24 and 25 are views similar to FIGS. 1 and 2, respectively, and illustrate an alternative embodiment of the present invention.
Figure 25:
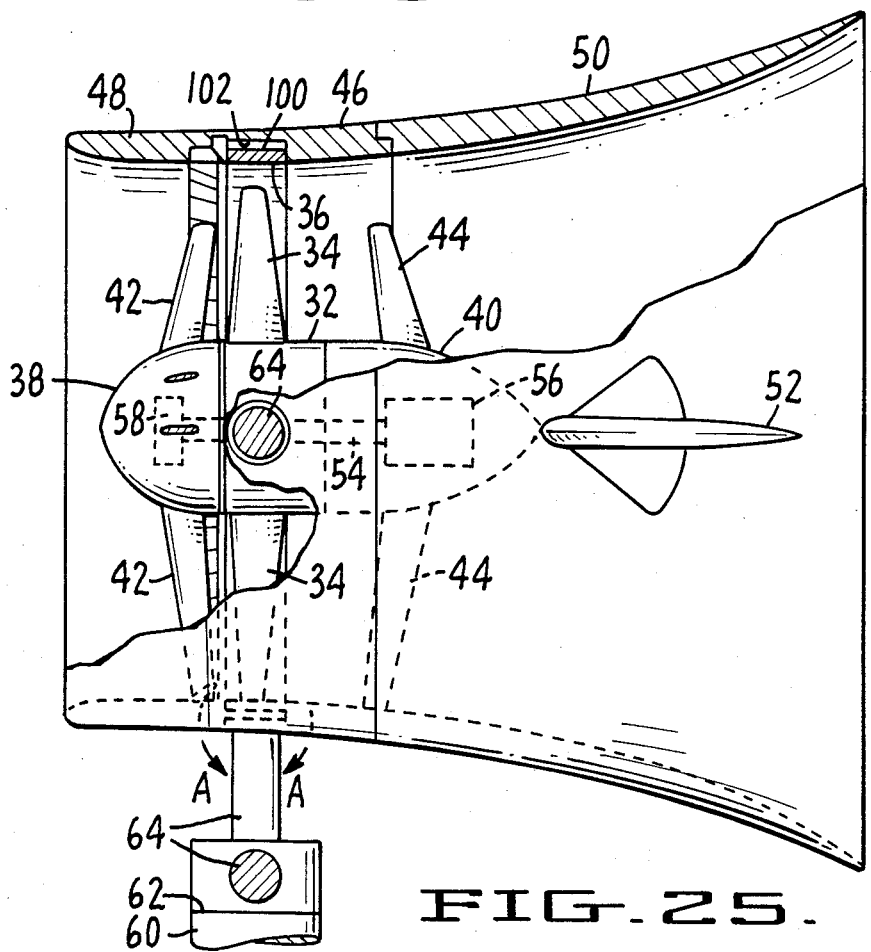

FIGS. 24 and 25 illustrate a fluid turbine assembly similar to that of FIGS. 1 and 2 but with a more elongate shroud having a catenary configuration 8 and 10. Preferably, the diameter of the downstream end of diffuser shroud 50 is at least twice the diameter of the upstream end of inlet fairing 48. The axial length of the outer support structure is also preferably less than or equal to one and one-half times the diameter of the upstream end of inlet fairing 48.

Thus several embodiments of a novel fluid powered turbine generator have been disclosed. Although such embodiments have been described in some detail, it is to be understood that various changes can be made by persons skilled in the art without departing from the spirit and scope of the invention as defined by the appended claims.

We claim:

1. An axial flow fluid turbine generator apparatus comprising, in combination:
    a central support structure;
    a hollow outer support structure surrounding and connected to said central support structure and adapted to pass a steam of fluid between said support structures;
    an impellor-rotor rotatably mounted on said central support structure;
        said impellor-rotor having a plurality of circumferentially spaced non-magnetic fluid dynamic blade means for transferring energy from the stream of fluid; and
        a ring connecting the radial outward end of said blade means;
        said impellor-rotor including a central hub portion connected to the radial inward end of each of said blade means and each of said blade means having the shape of an airfoil, said airfoil having a positive angle of attack at said central hub portion and an angle of attack at said ring less than said positive angle at said central hub portion.

2. The apparatus of claim 1 wherein said ring includes an armature coil.

3. The apparatus of claim 2 wherein said armature coil is a printed circuit.

4. The apparatus of claim 2 wherein said armature coil is a stamped circuit.

5. The apparatus of claim 2 wherein said armature coil is a chemically-machined coil.

6. The apparatus of claim 2 including a plurality of magnets supported on said outer-support structure adjacent said armature.

7. The apparatus of claim 6 wherein said magnets include permanent magnets.

8. The apparatus of claim 6 wherein said magnets include electromagnets.

9. The apparatus of claim 1 including a plurality of magnets supported on said ring.

10. The apparatus of claim 9 wherein said magnets include permanent magnets.

11. The apparatus of claim 9 wherein said magnets include electromagnets.

12. The apparatus of claim 9 including an armature coil supported on said outer support structure adjacent said magnets.

13. The apparatus of claim 1 wherein said impellor-rotor including said blade means and said ring are one integral monolithic member.

14. An axial flow fluid turbine generator apparatus comprising, in combination:
a central support structure;
a hollow outer support structure surrounding and connected to said central support structure and adapted to pass a stream of fluid between said support structures;
an impellor-rotor rotatably mounted on said central support structure;
said impellor-rotor having a plurality of circumferentially spaced non-magnetic fluid dynamic blade means for transferring energy from the stream of fluid;
gimbal mounting means connected to and supporting said outer support structure; and
stabilizer means for aligning said outer support structure and said impellor-rotor with a fluid flow stream.

15. The apparatus of claim 14 including stabilizer control means for moving said stabilizer means to tilt said outer support structure gradually out of the fluid flow stream.

16. The apparatus of claim 15 wherein said stabilizer control means includes means for sensing the speed of said impellor-rotor means for tilting said outer support structure out of the fluid flow stream in response to impellor-rotor overspeed sensed by said sensing means.

17. The apparatus of claims 14 wherein said outer support structure includes a central stator portion, an upstream inlet fairing and a downstream diffuser shroud.

18. The apparatus of claim 1 wherein said outer-support structure includes a central stator portion, an upstream inlet fairing and a downstream diffuser shroud, said diffuser shroud formed as a toroid having catenoid inner surface.

19. The apparatus of claim 1 wherein said outer support structure includes a central stator portion, an upstream inlet fairing and a downstream diffuser shroud, said diffuser shroud formed as a toroid having catenoid, inner and outer surface.

20. The apparatus of claim 1 wherein said outer support structure includes a central stator portion, an upstream inlet fairing and a downstream diffuser shroud, said diffuser shroud formed as a toroid having a catenoid inner surface and a truncated conical outer surface.

21. The apparatus of claim 1 wherein said outer support structure includes a central stator portion, an upstream inlet fairing and a downstream diffuser shroud, said diffuser shroud formed as a toroid having a catenoid inner surface and a paraboloid outer surface.

22. The apparatus of claim 1 wherein said outer support structure includes a central stator portion, an upstream inlet fairing and a downstream diffuser shroud, the diameter of the downstream end of said diffuser shroud being at least double the diameter of the upstream end of said inlet fairing and the axial length of said outer support structure being less than or equal to one and one-half times the diameter of the upstream end of said inlet fairing.

23. The apparatus of claim 1 wherein said outer support structure includes a central stator portion, an upstream inlet fairing and a downstream diffuser shroud, and means for providing passage of fluid through said diffuser shroud.

24. The apparatus of claim 23 wherein said passage means directs fluid across the space between the outer and central support structures for discharge at said central support structure.

25. The apparatus of claim 23 wherein said passage means directs fluid along the inside surface of said diffuser shroud.

26. An axial flow fluid turbine generator apparatus comprising, in combination:
a central support structure;
a hollow outer support structure surrounding and connected to said central support structure and adapted to pass a stream of fluid between said support structures;
an impellor-rotor rotatably mounted on said central support structure;
said impellor-rotor having a plurality of circumferentially spaced non-magnetic fluid dynamic blade means for transferring energy from the stream of fluid; and
said outer support structure including a central stator portion, and upstream inlet fairing and a downstream diffuser shroud, said diffuser shroud being hollow and at least the inner surface of said shroud formed of a flexible material for flexure with fluid flow through said apparatus.

27. The apparatus of claim 26 wherein the outer surface of said shroud is formed of a flexible material.

28. The apparatus of claims 26 or 27 including means for applying pressure inside said hollow shroud.

29. An axial flow turbine generator apparatus comprising, in combination:
a central support structure;
a hollow outer support structure surrounding and connected to said central support structure and adapted to pass a stream of fluid between said support structures;
an impellor-rotor rotatably mounted on said central support structure, said impellor-rotor including a plurality of circumferentially spaced fluid dynamic blade means for transferring energy from the stream of fluid and further including a ring connecting the radial outward ends of said blade means; and
peripheral generating means for generating electrical power, including a stator generating element including a plurality of magnets mounted on said outer support structure and a rotor generating element mounted on said impellor-rotor ring and including an armature coil carried on a planar substrate which lies in a plane generally normal to an axis of rotation of said impellor-rotor;

said plurality of magnets being circumferentially spaced around said outer support structure adjacent said planar substrate and in two opposing rings, with said planar substrate being disposed between said two opposing rings.

30. The apparatus of claim 29 wherein said peripheral generating means includes a plurality of magnets which produce flux along a flux path and said fluid dynamic blades are disposed outside of said flux path.

31. The apparatus of claim 29 wherein said armature coil and said planar substrate form a printed circuit.

32. The apparatus of claim 29 wherein said armature coil is stamped on said substrate.

33. The apparatus of claim 29 wherein said armature coil is a chemically-milled coil.

34. The apparatus of claim 29 wherein said magnets in one of said opposing rings have alternating polarity poles facing said planar substrate.

35. The apparatus of claim 34 wherein one of said magnetic pole pieces of one of said opposing rings is facing a corresponding one of said magnets of the other of said opposing rings, with opposite polarity poles of said corresponding magnets being adjacent said planar armature.

36. An axial flow turbine generator apparatus comprising, in combination:
 a central support structure;
 a hollow outer support structure surrounding and connected to said central support structure and adapted to pass a stream of fluid between said support structures;
 an impellor-rotor rotatably mounted on said central support structure, said impellor-rotor including a plurality of circumferentially spaced fluid dynamic blade means for transferring energy from the stream of fluid and further including a ring connecting the radial outward ends of said blade means; and
 peripheral generating means for generating electrical power, including a stator generating element mounted on said outer support structure and a rotor generating element mounted on said impellor-rotor ring.
 said stator generating element including a plurality of magnets and said rotor generating element including a plurality of spaced apart planar substrates, each of said substrates carrying an armature coil, with said planar substrates being coaxially aligned with said impellor-rotor and lying in respective planes normal to an axis of rotation of said impellor-rotor.

37. The apparatus of claim 36 wherein said magnets are circumferentially spaced around said outer support structure in rows intermediate said planar substrates.

38. An axial flow turbine generator apparatus comprising, in combination:
 a central support structure;
 a hollow outer support structure surrounding and connected to said central support structure and adapted to pass a stream of fluid between said support structures;
 an impellor-rotor rotatably mounted on said central support structure, said impellor-rotor including a plurality of circumferentially spaced fluid dynamic blade means for transferring energy from the stream of fluid and further including a ring connecting the radial outward ends of said blade means; and
 peripheral generating means for generating electrical power including a stator generating element including a plurality of magnetics mounted on said outer support structure and a rotor generating element including an armature coil mounted on said impellor-rotor ring;
 said rotor generating element further including a tubular substrate, coaxial with said impellor-rotor ring, which carries said armature coil.

39. The apparatus of claim 38 wherein said tubular substrate is a bi-curved tubular substrate having a curved cross-section in planes both normal and parallel to an axis of rotation of said impellor-rotor.

40. An axial flow turbine generator apparatus comprising, in combination:
 a central support structure;
 a hollow outer support structure surrounding and connected to said central support structure and adapted to pass a stream of fluid between said support structures;
 an impellor-rotor rotatably mounted on said central support structure, said impellor-rotor including a plurality of circumferentially spaced fluid dynamic blade means for transferring energy from the stream of fluid and further including a ring connecting the radial outward ends of said blade means; and
 peripheral generating means for generating electrical power, including a stator generating element mounted on said outer support structure and a rotor generating element mounted on said impellor-rotor ring;
 said peripheral generating means further including energy transfer means for transferring electrical energy from said armature coil to a non-rotating structure of said turbine generator apparatus, said energy transfer means including an inductive coupler having a primary winding which rotates with said impellor-rotor and a secondary winding which is mounted on said non-rotating structure.

41. The apparatus of claim 40 wherein said energy transfer means further includes inverter means for converting an electrical output of said armature coil, which is at a first frequency, to an electrical output fed to said primary winding of said inductive coupler means which is at a second frequency different from said first frequency.

42. The apparatus of claim 41 wherein said primary winding of said inductive coupler means is positioned on said impellor-rotor and adjacent said central support structure.

43. The apparatus of claim 41 wherein said primary winding of said inductive coupler means is supported on said ring of said impellor-rotor.

44. The apparatus of claim 41 wherein said primary winding of said inductive coupler means is mounted on a coupler substrate which is coaxially aligned with said impellor-rotor.

45. The apparatus of claim 44 wherein said coupler substrate is tubular, having a surface which supports said primary winding which is generally parallel with an axis of rotation of said impellor-rotor.

46. The apparatus of claim 44 wherein said rotor generating element further includes a planar substrate which carries said armature coil, with said planar substrate lying in a plane generally normal to said impellor-rotor axis of rotation.

47. The apparatus of claim 46 wherein said coupler substrate is a planar substrate, with said planar substrate lying in a plane generally normal to said impellor-rotor axis of rotation.

48. An axial flow turbine generator apparatus comprising, in combination:
   a central support structure;
   a hollow outer support structure surrounding and connected to said central support structure and adapted to pass a stream of fluid between said support structures;
   an impellor-rotor rotatably mounted on said central support structure, said impellor-rotor including a plurality of circumferentially spaced fluid dynamic blade means for transferring energy from the stream of fluid and further including a ring connecting the radial outward ends of said blade means; and
   peripheral generating means for genrating electrical power, including a stator generating element mounted on said outer support structure and a rotor generating element mounted on said impellor-rotor ring;
   said peripheral generating means comprising an armature which includes an armature substrate having a generally U-shaped cross-section, said armature substrate including first and second spaced-apart tubular substrates and a third planar substrate, normal to and interconnecting said tubular substrates, with said armature further including an armature coil mounted on each of said first second and third substrates.

49. The apparatus of claim 48 wherein said stator generating element includes said armature.

50. The apparatus of claim 48 wherein said rotor generating element includes said armature.

51. An axial flow turbine generator apparatus comprising, in combination:
   a central support structure;
   a hollow outer support structure surrounding and connected to said central support structure and adapted to pass a stream of fluid between said support structures;
   an impellor-rotor rotatably mounted on said central support structure, said impellor-rotor including a plurality of circumferentially spaced fluid dynamic blade means for transferring energy from the stream of fluid and further including a ring connecting the radial outward ends of said blade means;
   peripheral generating means for generating electrical power, including a stator generating element mounted on said outer support structure and a rotor generating element mounted on said impellor-rotor; and
   centerbody generating means for generating electrical power, said centerbody generating means including a stator generating element and a rotor generating element both having a diameter substantially less than diameters of said peripheral generating means, stator generating element and rotor generating element.

52. The apparatus of claim 51 wherein said centerbody generating means, stator generating element and rotor generating element are mounted on, and in proximity to, said center support structure.

53. An axial flow turbine generator apparatus comprising, in combination:
   a central support structure;
   a hollow outer support structure surrounding and connected to said central support structure and adapted to pass a stream of fluid between said support structures;
   an impellor-rotor rotatably mounted on said central support structure, said impellor-rotor including a plurality of circumferentially spaced fluid dynamic blade means for transferring energy from the stream of fluid and further including a ring connecting the radial outward ends of said blade means;
   peripheral generating means for generating electrical power, including a stator generating element mounted on said outer support structure and a rotor generating element mounted on said impellor-rotor ring; and
   a centerbody generating means for generating electrical power, said centerbody generating means including a stator generating element and a rotor generating element both having a diameter substantially less than diameters of said peripheral generating means, stator generating element and rotor generating element and mounted on, and proximity to, said center support structure;
   said turbine generator apparatus further including control means for activating and de-activating said centerbody generating means in response to electrical power output of said peripheral generating means.

54. An axial flow turbine generator apparatus comprising, in combination:
   a central support structure;
   a hollow outer support structure surrounding and connected to said central support structure and adapted to pass a stream of fluid between said support structures;
   an impellor-rotor rotatably mounted on said central support structure, said impellor-rotor including a plurality of circumferentially spaced fluid dynamic blade means for transferring energy from the stream of fluid and further including a ring connecting the radial outward ends of said blade means;
   peripheral generating means for generating electrical power, including a stator generating element mounted on said outer support structure and a rotor generating element mounted on said impellor-rotor ring;
   a centerbody generating means for generating electrical power, said centerbody generating means including a stator generating element and a rotor generating element both having a diameter substantially less than diameters of said peripheral generating means, stator generating element and rotor generating element and mounted on, and proximity to, said center support structure, and
   control means for activating and deactivating said centerbody generating means in response to changes in flow velocity of the stream of fluid.

55. The apparatus of claim 29 further including gimbal mounting means connected to and supporting said outer support structure which permits said outer structure to rotate about first and second orthogonal axes.

56. The apparatus of claim 55 wherein said gimbal mounting means is supported on a tower with said impellor-rotor having an axis of rotation which generally intersects said first and second orthogonal axes.

57. The apparatus of claim 56 wherein said first axis coincides with a longitudinal axis of said tower and said outer support structure has a center of pressure which is offset and downstream of said first axis.

58. An axial flow turbine generator apparatus comprising, in combination:
- a central support structure;
- a hollow outer support structure surrounding and connected to said central support structure and adapted to pass a stream of fluid between said support structures;
- an impellor-rotor rotatably mounted on said central support structure, said impellor-rotor including a plurality of circumferentially spaced fluid dynamic blade means for transferring energy from the stream of fluid and further including a ring connecting the radial outward ends of said blade means; and
- peripheral generating means for generating electrical power, including a stator generating element mounted on said outer support structure and a rotor generating element mounted on said impellor-rotor ring;
- said rotor generating element including a tubular substrate, coaxial with said impellor-rotor ring, which carries said armature coil.

59. The apparatus of claim 58 wherein said armature coil is comprised of a plurality of squaril windings.

60. The apparatus of claim 59 wherein said tubular substrate and said armature coil form a printed circuit.

61. The apparatus or claim 29 wherein said armature coil is comprised of a plurality of squaril windings.

62. The apparatus of claim 61 wherein said planar substrate and said armature coil form a printed circuit.

63. The apparatus of claim 29 wherein said outer support structure is formed of segments arranged around the circumference of said outer support structure.

* * * * *